United States Patent
Yamamoto et al.

(10) Patent No.: US 10,597,566 B2
(45) Date of Patent: Mar. 24, 2020

(54) ORGANOPOLYSILOXANE EMULSION COMPOSITION FOR RELEASE PAPER OR RELEASE FILM, METHOD FOR PRODUCING SAME, AND RELEASE PAPER AND RELEASE FILM

(71) Applicant: SHIN-ETSU CHEMICAL CO., LTD., Tokyo (JP)

(72) Inventors: Kenji Yamamoto, Annaka (JP); Tsutomu Nakajima, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 0 days.

(21) Appl. No.: 15/562,683

(22) PCT Filed: Mar. 17, 2016

(86) PCT No.: PCT/JP2016/058535
§ 371 (c)(1),
(2) Date: Sep. 28, 2017

(87) PCT Pub. No.: WO2016/163219
PCT Pub. Date: Oct. 13, 2016

(65) Prior Publication Data
US 2018/0094178 A1  Apr. 5, 2018

(30) Foreign Application Priority Data
Apr. 6, 2015 (JP) .................. 2015-077915

(51) Int. Cl.
| | |
|---|---|
| C09J 183/06 | (2006.01) |
| B32B 27/00 | (2006.01) |
| C09K 3/00 | (2006.01) |
| C09D 5/02 | (2006.01) |
| D21H 27/00 | (2006.01) |
| C09D 7/40 | (2018.01) |
| C09J 7/40 | (2018.01) |
| C09D 183/06 | (2006.01) |
| C09J 7/20 | (2018.01) |
| C09D 183/12 | (2006.01) |
| C08L 71/02 | (2006.01) |
| C08L 83/06 | (2006.01) |
| C08G 77/46 | (2006.01) |
| C08G 77/12 | (2006.01) |
| C08G 77/20 | (2006.01) |

(52) U.S. Cl.
CPC ............ *C09J 183/06* (2013.01); *B32B 27/00* (2013.01); *C08L 71/02* (2013.01); *C08L 83/06* (2013.01); *C09D 5/02* (2013.01); *C09D 7/40* (2018.01); *C09D 183/06* (2013.01); *C09D 183/12* (2013.01); *C09J 7/201* (2018.01); *C09J 7/401* (2018.01); *C09K 3/00* (2013.01); *D21H 27/00* (2013.01); *D21H 27/001* (2013.01); *C08G 77/12* (2013.01); *C08G 77/20* (2013.01); *C08G 77/46* (2013.01); *C08L 2308/00* (2013.01); *C09J 2400/283* (2013.01); *C09J 2483/005* (2013.01)

(58) Field of Classification Search
CPC ............................. C09J 183/06; D21H 27/001
See application file for complete search history.

(56) References Cited

U.S. PATENT DOCUMENTS

| | | | | |
|---|---|---|---|---|
| 4,248,750 A | | 2/1981 | Murakami et al. | |
| 5,132,047 A | * | 7/1992 | Tanaka ................ | B01F 17/0071 106/287.14 |
| 5,550,270 A | * | 8/1996 | Takarada ............. | C08G 77/045 556/440 |
| 5,633,311 A | * | 5/1997 | Yamamoto ............ | C08G 77/06 528/12 |
| 5,811,487 A | * | 9/1998 | Schulz, Jr. ............. | A61K 8/895 524/261 |
| 5,908,951 A | * | 6/1999 | Kobayashi ........... | B01J 31/0225 502/152 |

(Continued)

FOREIGN PATENT DOCUMENTS

| | | | | |
|---|---|---|---|---|
| EP | 2444463 A1 | * | 4/2012 | .......... C09D 183/04 |
| JP | 6-340813 A | | 12/1994 | |

(Continued)

OTHER PUBLICATIONS

International Search Report (PCT/ISA/210) issued in PCT/JP2016/058535, dated May 31, 2016.
Written Opinion (PCT/ISA/237) issued in PCT/JP2016/058535, dated May 31, 2016.
Extended European Search Report dated Oct. 18, 2018, in European Patent Application No. 16776388.7.

Primary Examiner — Liam J Heincer
(74) Attorney, Agent, or Firm — Birch, Stewart, Kolasch & Birch, LLP

(57) ABSTRACT

An organopolysiloxane emulsion composition for release paper or a release film, said composition being produced by dispersing a mixture comprising components (A) to (D) as mentioned below in water: (A) an alkenyl-group-containing diorganopolysiloxane having at least two alkenyl groups per molecule and having a viscosity of 1,000 Pa·s or less at 25° C., in an amount of 100 parts by mass; (B) an organohydrogenpolysiloxane having at least two Si—H groups per molecule and having a viscosity of 1 Pa·s or less at 25° C., in such an amount that the number of moles of an Si—H group can become 0.5 to 10 times the number of moles of an alkenyl group in the component (A); (C) a curing catalyst, in an amount of 0.01 to 3 parts by mass; and (D) a polyether-modified and/or polyol-modified organosilicon compound, in an amount of 0.01 to 10 parts by mass.

13 Claims, No Drawings

(56) References Cited

U.S. PATENT DOCUMENTS

| | | | |
|---|---|---|---|
| 6,184,406 B1* | 2/2001 | Geck | C08J 3/03 106/287.14 |
| 6,187,891 B1* | 2/2001 | Rautschek | B01D 19/0409 528/15 |
| 6,365,670 B1* | 4/2002 | Fry | A61K 8/894 424/59 |
| 6,423,322 B1* | 7/2002 | Fry | A61K 8/042 424/401 |
| 8,685,376 B2* | 4/2014 | Czech | A61K 8/893 424/70.19 |
| 2003/0134131 A1* | 7/2003 | Yamamoto | C09D 183/04 428/447 |
| 2003/0155547 A1* | 8/2003 | Ludemann | C08L 83/04 252/8.84 |
| 2005/0261133 A1* | 11/2005 | Nakanishi | C08G 77/045 504/358 |
| 2007/0128143 A1* | 6/2007 | Gruning | A61K 8/894 424/70.12 |
| 2007/0167563 A1* | 7/2007 | Cray | C08G 77/20 524/588 |
| 2008/0064782 A1* | 3/2008 | Doehler | C08L 83/06 522/99 |
| 2010/0113731 A1* | 5/2010 | Hayashi | C08G 77/16 528/33 |
| 2012/0251598 A1* | 10/2012 | Ikeda | C08L 83/04 424/401 |
| 2012/0269747 A1* | 10/2012 | Iimura | A61Q 19/00 424/59 |
| 2013/0210930 A1* | 8/2013 | Souda | A61K 8/891 514/772 |
| 2013/0224502 A1 | 8/2013 | Nakajima et al. | |
| 2014/0161758 A1* | 6/2014 | Tamura | C08G 77/46 424/78.02 |
| 2014/0322280 A1* | 10/2014 | Inokuchi | A61K 8/0245 424/401 |
| 2014/0364394 A1* | 12/2014 | Tamura | C08G 77/38 514/63 |
| 2014/0371330 A1* | 12/2014 | Hayashi | A61Q 1/00 514/772 |
| 2015/0225574 A1 | 8/2015 | Kanto et al. | |
| 2015/0376482 A1* | 12/2015 | Bekemeier | C08G 77/18 428/447 |

FOREIGN PATENT DOCUMENTS

| | | |
|---|---|---|
| JP | 8-337754 A | 12/1996 |
| JP | 11-513060 A | 11/1999 |
| JP | 2005-306994 A | 11/2005 |
| JP | 4823403 B2 | 11/2011 |
| JP | 2 444 463 A1 | 4/2012 |
| JP | 2012-092165 A | 5/2012 |
| WO | WO 2014/042188 A1 | 3/2014 |

* cited by examiner

ORGANOPOLYSILOXANE EMULSION COMPOSITION FOR RELEASE PAPER OR RELEASE FILM, METHOD FOR PRODUCING SAME, AND RELEASE PAPER AND RELEASE FILM

TECHNICAL FIELD

The present invention relates to an organopolysiloxane emulsion composition for release paper or release film that has improved wettability on various substrates, a method for preparing such a composition, and release paper and release film obtained by applying the composition to a paper or film substrate and curing the composition.

BACKGROUND ART

To prevent adhesion and sticking between substrates such as paper or plastic and pressure-sensitive bonding materials, release properties have hitherto been imparted to the surface of the substrate by forming thereon a cured coat of a silicone composition. Addition reaction-based methods of forming release coats are widely used to form silicone cured coats on such substrate surfaces because the curability is excellent and such methods are able to address a variety of release property requirements, from low-speed release to high-speed release. Condensation reaction-based methods of forming release coats, which saw practical use earlier than addition reaction-based methods, are still in use today because they have the advantage of not being affected by addition reaction catalyst poisons.

These reaction curing-based release coat-forming methods make use of materials in which the silicone composition is dissolved in an organic solvent, types of materials in which an emulsifying agent is used to disperse the silicone composition in water and render it into an emulsion, and solventless-type materials that consist only of silicone. Because solvent-type materials are harmful to the human body and the environment, owing to safety concerns, a transition from these to solventless-type materials or emulsion-type materials is currently underway. Emulsion-type materials, in addition to their safety, can be freely diluted with water and used, and can also be freely mixed with other aqueous materials and emulsion materials. For these and other reasons, emulsion-type materials are outstanding in terms of applications and are expected to see increased use in the future.

However, it has been noted to date that, compared with solvent-type compositions, emulsion-type compositions, following application to a substrate and curing, have an to inferior cured coat appearance and surface smoothness. One cause given for this is the water that is used as the silicone-dispersing medium. The reason is thought to be that water, compared with other solvents, has a surface tension which is too high, lowering the wettability and leveling ability of the emulsion composition on the substrate surface. This influence is especially striking in cases where the release composition is applied onto a film substrate having good surface smoothness and low surface tension. Therefore, when producing a release film by applying a release composition onto a commercial film, use is generally made of a solvent-type release composition.

The processing technique whereby a release composition is applied onto a film during production on a film production line, simultaneously applies to the film a release composition is known as in-line coating; emulsion-type compositions can be used for such coating. Emulsion-type compositions are chosen because of such constraints on film production lines as the inability to use flammable liquids and other dangerous materials and the difficulty of installing bulky coating equipment along the line where space is tight. Even at in-line coating, the low wettability and leveling ability of the emulsion-type composition on the substrate surface diminishes the appearance and surface smoothness of the release film. Hence, there remains a desire today for further improvement in the appearance and surface smoothness of release films.

The general trend of late in the solvent use environment has been toward increasing severity, as evidenced by, for example, reductions in environment impacts, stronger restrictions on solvent emissions, improved safety in the work environment, and the rising costs associated with the storage and handling of dangerous materials. Given the push today to eliminate as much as possible residual solvents from materials used close at hand in daily life, such as food packaging, cooking materials, children's commodities and indoor building materials, the range of potential applications for solventless emulsion compositions is growing.

Among conventional methods for improving the appearance and surface smoothness of cured coats of emulsion-type compositions, one common approach has been to include a surfactant. However, although this demonstrably lowers the surface tension of water as the to dispersion medium, the wettability of the film substrate surface leaves something to be desired. Also, surfactant remaining within the cured coat often has a poor compatibility with silicone, sometimes clouding the applied coat and causing appearance defects to arise. One solution has been to use a water-soluble thickener or thixotropic agent to suppress crawling by emulsion-type composition coats on the surface of film substrates. However, as with surfactants, this approach has not been effective for improving the appearance.

One way to improve the silicone phase within emulsion-type compositions is emulsion particle size control, but this is not a practical solution for resolving the problem of smoothness. A smaller particle size and narrower particle size variance results in a silicone coat having a smoother surface state following vaporization of the aqueous phase, but as the particle size becomes smaller under a limited surfactant concentration, the stability of the emulsion particles themselves decreases and agglomeration and coalescence tend to proceed; ultimately, the particle size variance broadens and the particles become larger in size, and so a smooth coated surface state is not obtained. Harsh conditions that most compromise the stability of the emulsion particles are curing steps that bring about a higher concentration by means of a rapid rise in temperature or water vaporization. Because the temperature rise conditions at in-line coating in particular are set so as to accommodate film processing, this cannot help but be exceedingly disadvantageous for emulsion-type compositions. Even when the amount of surfactant is increased and the particle size is reduced so as to ensure stability of the emulsion particles, clouding of the applied coat becomes very bad, in addition to which the release properties end up worsening due to a decrease in curability. Therefore, particularly in the production of release films, improvement by way of emulsion particle size control is currently an ineffective approach.

An additional problem is the decline in appearance and surface smoothness of the release film as the curing reaction proceeds over time (pot life) following preparation of the release composition. Normally, the curing reaction within the release composition can be kept from proceeding by the suitable addition of a regulator. However, in the case of emulsion-type compositions, as the curing reaction proceeds over time (pot life), the physical stability of the emulsion particles is also greatly affected. This difference influences the process of, in the curing step, the agglomeration and coalescence of emulsion particles to form a uniform silicone layer, and appears as a difference in the surface state and transparency of the final cured coat. At in-line coating in particular, the temperature of the emulsion composition prior to coating which is positioned and circulates in close proximity to the high-temperature film processing line tends to rise and the coating time also increases, further aggravating the effects. Accordingly, there exists a desire for an approach that differs from the use of a regulator.

The relationship between the physical stability of emulsion particles and their volume-average particle size has hitherto been pointed out. For example, JP No. 4823403 (Patent Document 1) describes setting the volume-average particle size of a platinum-alkenyl siloxane complex catalyst for an emulsion-type hydrosilylation reaction to 1 µm or less. However, changing the size of the emulsion particles was not observed to be effective whatsoever in satisfying the performance that is the object of the subsequently described instant invention.

In emulsion-type compositions, prior to the curing step, it is desired that addition reactions be suppressed as much as possible while keeping the emulsion state stable. In the curing step, it is desired that the process of change in the emulsion particle size itself, wherein the size of the emulsion particles rapidly increases toward formation of a continuous silicone phase, be controlled so as to reproducibly form a smooth, transparent cured coat. The emulsion particle size is most likely an effective indicator for maintaining and stabilizing a state in which the particle size itself does not change. However, in cases where it does change, the presumption is that the particle size cannot serve as the leading indicator.

Hence, there are limitations to the improvement effects achieved by existing methods of improvement, and so there exists a desire for an emulsion-type composition which can be employed in the production of release paper or release film having an appearance/transparency and surface smoothness that can stand up to use in a broad range of applications.

PRIOR ART DOCUMENTS

Patent Documents

Patent Document 1: JP No. 4823403

SUMMARY OF THE INVENTION

Problems to be Solved by the Invention

In light of the above circumstances, an object of the invention is to provide organopolysiloxane emulsion compositions which can be used in the production of release paper and release film having an applied coat with an excellent appearance/transparency and excellent surface smoothness, methods for producing such compositions, and release paper and release film of excellent appearance/transparency and surface smoothness that are obtained by applying and curing these organopolysiloxane emulsion compositions.

Means for Solving the Problems

The inventors have conducted extensive investigations in order to achieve these objects. As a result, they have discovered that by using, in an organopolysiloxane emulsion composition, a polyether-modified and/or polyol-modified organosilicon compound as a surfactant, the dispersibility and compatibility of the surfactant within the cured coat can be improved, in addition to which the leveling ability and coatability are also enhanced, thus enabling a coat appearance/transparency comparable to or better than that in the conventional art to be obtained.

Accordingly, this invention provides the following organopolysiloxane emulsion composition for release paper or release film, the following method for producing the same, and the following release paper and release film.

[1] An organopolysiloxane emulsion composition for release paper or release film that is obtained by dispersing in water a mixture which includes the following components (A) to (D):

(A) 100 parts by weight of an alkenyl group-containing diorganopolysiloxane having at least two alkenyl groups per molecule and having a viscosity at 25° C. of not more than 1,000 Pa·s;

(B) an organohydrogenpolysiloxane having at least two Si—H groups per molecule and having a viscosity at 25° C. of not more than 1 Pa·s, in an amount corresponding to a number of moles of Si—H groups that is from 0.5 to 10 times the number of moles of alkenyl groups in component (A);

(C) from 0.01 to 3 parts by weight of a curing catalyst; and (D) from 0.01 to 10 parts by weight of a polyether-modified and/or polyol-modified organosilicon compound.

[2] The organopolysiloxane emulsion composition for release paper or release film of [1], wherein component (D) is a compound of any one of the following general formulas (8) to (10)

[Chemical Formula 1]

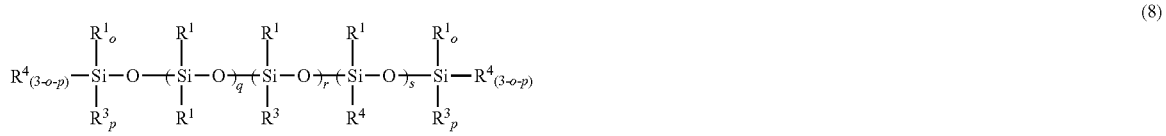

(8)

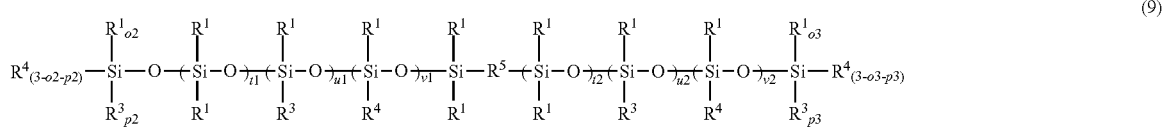

(9)

(10)

wherein each $R^1$ is independently a substituted or unsubstituted monovalent hydrocarbon group of 1 to 20 carbon atoms without an aliphatic unsaturated bond; each $R^2$ is independently a substituted or unsubstituted alkenyl group of 2 to 20 carbon atoms; each $R^3$ is independently a hydrogen atom, a hydroxyl group, an alkoxy group of 1 to 4 carbon atoms, or a substituted or unsubstituted alkenyl group of 2 to 20 carbon atoms; each $R^4$ is independently a monovalent hydrophilic group; $R^5$ is a divalent hydrophilic group; q, r, s, t1, t2, u1, u2, v1 and v2 are integers of 0 or more; q+r+s and t1+u1+v1+t2+u2+v2 are each integers from 0 to 98; o and o1 to o3 are integers from 0 to 3; p and p1 to p3 are integers from 0 to 3; o+p is an integer from 0 to 3; o1+p1 is an integer from 0 to 3; o2+p2 is an integer from 0 to 3; o3+p3 is an integer from 0 to 3; when o+p is 3, s is 1 or more; and when o2+p2 and o3+p3 are each 3, v1 or v2 is 1 or more.

[3] The organopolysiloxane emulsion composition for release paper or release film of [2], wherein $R^4$ in formulas (8) to (10) is selected from the groups having the following formulas:

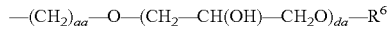

wherein $R^6$ is a substituted or unsubstituted monovalent hydrocarbon group of 1 to 10 carbon atoms without an aliphatic unsaturated bond, or a hydrogen atom; as is an integer from 1 to 10; ba and ca are each integers from 0 to 20; ba+ca is an integer from 1 to 20; and da is an integer from 1 to 20.

[4] The organopolysiloxane emulsion composition for release paper or release film of any of [1] to [3], wherein the mixture further includes (E) from 0.1 to 10 parts by weight, per 100 parts by weight of component (A), of an organopolysiloxane resin composed primarily of M units of formula (1) below and Q units of formula (2) below in a molar ratio of M units to Q units (M/Q) in the range of 1/9 to 9/1:

[Chemical Formula 2]

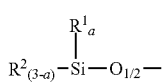

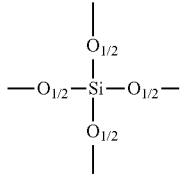

wherein each $R^1$ is independently a substituted or unsubstituted monovalent hydrocarbon group of 1 to 20 carbon atoms without an aliphatic unsaturated bond; each $R^2$ is independently a substituted or unsubstituted alkenyl group of 2 to 20 carbon atoms; the letter a is an integer from 0 to 3; and $O_{1/2}$— indicates that another unit is bonded through $O_{1/2}$—.

[5] The organopolysiloxane emulsion composition for release paper or release film of any of [1] to 141, wherein the mixture further includes (F) from 0.1 to 50 parts by weight of an adhesion promoter per 100 parts by weight of component (A).

[6] The organopolysiloxane emulsion composition for release paper or release film of [5], wherein component (F) is an organopolysiloxane resin composed primarily of $(R^1SiO_{3/2})$ units (T units) and $(R^1{}_aR^2{}_{(3-a)}SiO_{1/2})$ units (M units) (wherein each $R^1$ is independently a substituted or unsubstituted monovalent hydrocarbon group of 1 to 20 carbon atoms without an aliphatic unsaturated bond; each $R^2$ is independently a substituted or unsubstituted alkenyl group of 2 to 20 carbon atoms; and the letter a is an integer from 0 to 3) in a molar ratio of M units to T units (M/T) in the range of 1/9 to 9/1.

[7] The organopolysiloxane emulsion composition for release paper or release film of any of [1] to [6], wherein the mixture further includes (G) from 0.1 to 20 parts by weight of an emulsifying agent per 100 parts by weight of component (A).

[8] The organopolysiloxane emulsion composition for release paper or release film of any of [1] to [7], wherein the mixture further includes (H) from 0.1 to 10 parts by weight of a pot-life extender per 100 parts by weight of component (A).

[9] A method for preparing the organopolysiloxane emulsion composition for release paper or release film of any of [1] to [8], which method includes the steps of preparing:

Emulsion Composition 1 obtained by dispersing in water a mixture containing component (B), lacking component (C), and optionally containing some or all of component (A) and components (D) to (H), and Emulsion Composition 2 obtained by dispersing in water a mixture containing component (C), lacking component (B), and additionally containing the remaining components, such that the sum of the silicone components in Composition 2 is 3 parts by weight or less per 100 parts by weight of the sum of the silicone components in Compositions 1 and 2; and mixing together Compositions 1 and 2 just prior to use.

[10] A method for preparing the organopolysiloxane emulsion composition for release paper or release film of any of [1] to [8], which method includes the steps of preparing:

Emulsion Composition 1' obtained by dispersing in water a mixture containing component (B), lacking components (C) and (D), and optionally containing some or all of component (A) and components (E) to (H), Emulsion Composition 2' obtained by dispersing in water a mixture containing component (C), lacking components (B) and (D), and optionally containing some or all of component (A) and components (E) to (H), and Emulsion Composition 3' obtained by dispersing in water a mixture containing to component (D), lacking component (B) and/or component (C), and additionally containing the remaining components, such that the sum of the silicone components in Composition 2' is 3 parts by weight or less per 100 parts by weight of the sum of the silicone components in Compositions 1', 2' and 3'; and mixing together Compositions 1', 2' and 3' just prior to use.

[11] A release paper or release film obtained by applying the organopolysiloxane emulsion composition for release paper or release film of any of [1] to [8] to a paper or film substrate, and curing the applied composition.

Advantageous Effects of the Invention

This invention, by applying a coatability-improving additive-containing organopolysiloxane emulsion composition for release paper or release film to various types of substrates and curing the composition, makes it possible to obtain a cured coat having a good coating surface smoothness, uniformity and appearance/transparency. High improvement effects are obtained with a small amount of addition, and the release properties of the cured coat are also good. Moreover, by enhancing wetting of the coating equipment, the coated state is stabilized in a short time and maintained, making it possible to anticipate improvements in coating workability, such as speeding up of the coating operation and increased yield.

EMBODIMENT FOR CARRYING OUT THE INVENTION

The invention is described more fully below.

The organopolysiloxane emulsion composition for release paper or release film of the invention is obtained by dispersing in water a mixture that includes the following components (A) to (D) and, optionally, components (E) to (H).

(A) an alkenyl group-containing diorganopolysiloxane having at least two alkenyl groups per molecule and having a viscosity at 25° C. of not more than 1,000 Pa·s,
(B) an organohydrogenpolysiloxane having at least two Si—H groups per molecule and having a viscosity at 25° C. of not more than 1 Pa·s,
(C) a curing catalyst,
(D) a polyether-modified and/or polyol-modified organosilicon compound,
(E) an organopolysiloxane resin containing M units of formula (1) below and Q units of formula (2) below in a molar ratio of M units to Q units (M/Q) in the range of 1/9 to 9/1

[Chemical Formula 3]

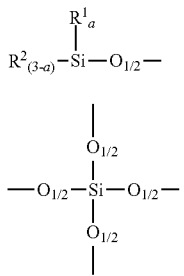

(1)

(2)

(wherein each $R^1$ is independently a substituted or unsubstituted monovalent hydrocarbon group of 1 to 20 carbon atoms without an aliphatic unsaturated bond; each $R^2$ is independently a substituted or unsubstituted alkenyl group of 2 to 20 carbon atoms; the letter a is an integer from 0 to 3; and $O_{1/2}$— indicates that another unit is bonded through $O_{1/2}$—),
(F) an adhesion promoter,
(G) an emulsifying agent, and
(H) a pot-life extender.

[Component (A)]

Component (A) is an alkenyl group-containing diorganopolysiloxane having at least two alkenyl groups per molecule and having a viscosity at 25° C. of not more than 1,000 Pa·s. It serves as the base polymer in the inventive composition.

The alkenyl group-containing diorganopolysiloxane used as component (A) has a viscosity at 25° C., as a 30 wt % toluene solution, of preferably not more than 100 Pa·s. In undiluted form, it has a viscosity at 25° C. of preferably 0.01 Pa·s or more. Component (A) may be a single compound used alone or may be two or more compounds used in admixture. The viscosity at 25° C. of a mixture of all component (A) compounds, in a form not diluted with solvent or the like, is not more than 1,000 Pa s, and preferably from 0.01 to 100 Pa·s. At a viscosity higher than this, obtaining the organopolysiloxane emulsion composition becomes difficult. Here and below, the viscosity is a value measured at 25° C. with a rotational viscometer.

The diorganopolysiloxane of component (A) has at least two alkenyl groups per molecule, the alkenyl group content being preferably from 0.001 to 0.3 mol/100 g, and especially from 0.002 to 0.25 mol/100 g. When the alkenyl group content is too low, the curability of the composition may decrease; when it is too high, the release properties may decline. The alkenyl group content can be determined by NMR measurement.

The diorganopolysiloxane of component (A) is based on a straight-chain molecular structure. However, within a range that does not influence the advantageous effects of the invention, branched structures that start at trifunctional siloxane and/or tetrafunctional siloxane units may be included in the molecule.

The specific structure of component (A) is exemplified by structures of the following formulas (3) to (6).

[Chemical Formula 4]

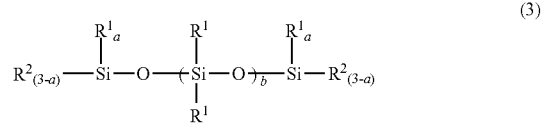

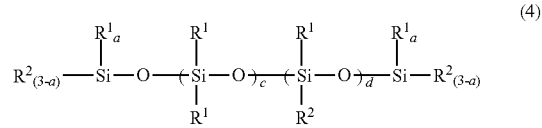

[Chemical Formula 5]

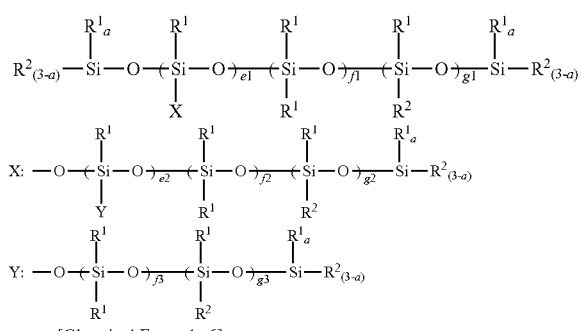

[Chemical Formula 6]

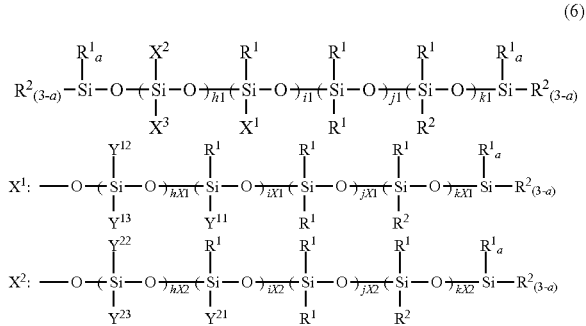

-continued

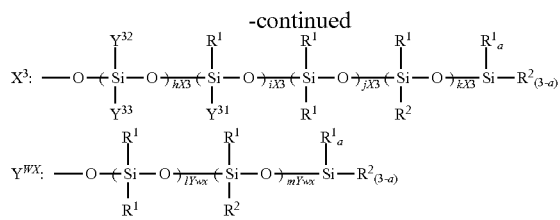

In these formulas, each $R^1$ is independently a substituted or unsubstituted monovalent hydrocarbon group of 1 to 20 carbon atoms without an aliphatic unsaturated bond; each $R^2$ is independently a substituted or unsubstituted alkenyl group of 2 to 20 carbon atoms; the letter a is an integer from 0 to 3, and preferably from 1 to 3; w is 1, 2 or 3; and x is 1, 2 or 3. Also, b, c, d, e1, e2, f1, f2, f3, g1, g2, g3, h1, i1, j1, k1, hX1, iX1, jX1, kX1, hX2, iX2, jX2, kX2, hX3, iX3, jX3, kX3, lY11, lY12, lY13, lY21, lY22, lY23, lY31, lY32, lY33, mY11, mY12, mY13, mY21, mY22, mY23, mY31, mY32 and mY33 are each integers of 0 or more, such that at least 0.01 mol % of all organic groups directly bonded to silicon atoms are alkenyl groups, the viscosity at 25° C. is at least 0.01 Pa·s, and the viscosity as a 30 wt %/o toluene solution is not more than 100 Pa s. In each structural formula, because the molecular framework is based on a straight-chain structure, the total number of D units (straight-chain structure-forming siloxane units) is equal to or more than the total number of T units and Q units. That is, the following conditions are satisfied: $1 \leq e1+e2 \leq f1+f2+g1+g2+g3$, and $1 \leq h1+i1+hX1+iX1+hX2+iX2+hX3+iX3 \leq j1+k1+jX1+kX1+jX2+kX2+jX3+kX3+lY11+lY12+lY13+lY21+lY22+lY23+lY31+lY32+lY33+mY11+mY12+mY13+mY21+mY22+mY23+mY31+mY32+mY33$. The total number of D units is preferably 2 or more times, and more preferably 3 or more times, the total number of T units and Q units.

In above formulas (3) to (6), $R^1$ is a substituted or unsubstituted monovalent hydrocarbon group of 1 to 20 carbon atoms, preferably 1 to 10 carbon atoms, without an aliphatic unsaturated bond. Specific examples include alkyl groups such as methyl, ethyl, propyl, butyl, pentyl, hexyl and octyl groups; cycloalkyl groups such as the cyclohexyl group; and monovalent hydrocarbon groups in which some or all hydrogen atoms bonded to carbon atoms on these groups are substituted with, for example, halogen atoms, cyano groups, alkoxy groups, hydroxyl groups or epoxy groups. The $R^1$ groups may be the same or different, although from a practical standpoint, it is preferable for at least 80 mol % of all $R^1$ groups to be methyl groups.

$R^2$ is a substituted or unsubstituted alkenyl group of 2 to 20 carbon atoms, and preferably 2 to 18 carbon atoms. Illustrative examples include alkenyl groups such as vinyl, allyl, propenyl, butenyl, pentenyl, hexenyl, octenyl, decenyl, dodecenyl, tetradecenyl, hexadecenyl and octadecenyl groups; cycloalkenyl groups such as cyclohexenyl, methylcyclohexenyl and cyclooctenyl groups; and alkenyl groups in which some or all hydrogen atoms bonded to carbon atoms on these groups are substituted with, for example, halogen atoms, cyano groups, alkoxyhydroxy groups or epoxy groups. The $R^2$ groups may be the same or different, although from a practical standpoint, vinyl groups are preferred.

Specific examples of component (A) include, but are not limited to, those of the following formulas. In these formulas, Me, Vi and Ph stand for, respectively, methyl, vinyl and phenyl groups.

[Chemical Formula 7]

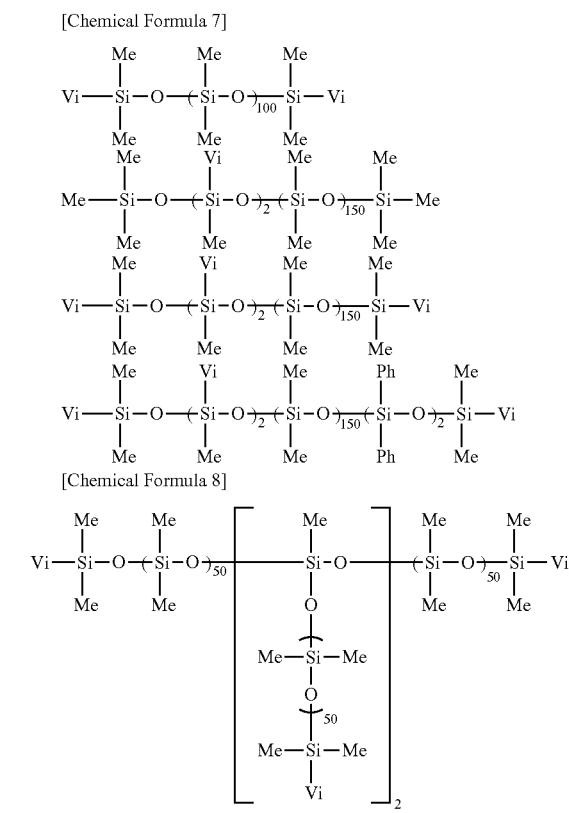

[Chemical Formula 8]

[Component (B)]

Component (B) is an organohydrogenpolysiloxane having at least two Si—H groups per molecule and having a viscosity at 25° C. of not more than 1 Pa·s. It acts as a crosslinking agent for the organopolysiloxane emulsion composition of the invention.

The organohydrogenpolysiloxane serving as component (B), for the purpose of obtaining an emulsion composition, has a viscosity at 25° C. of not more than 1 Pa·s, preferably from 0.005 to 1 Pa·s, and more preferably from 0.005 to 0.5 Pa·s. When the viscosity exceeds 1 Pa·s, the curability of the composition decreases.

The organohydrogenpolysiloxane serving as component (B) has at least two Si—H groups per molecule, with the Si—H group content being preferably from 0.01 to 1.5 mol/100 g, and more preferably from 0.02 to 1.4 mol/100 g. When the Si—H group content is too low, the curability of the composition may decrease; when it is too high, the pot life may shorten.

Although it is preferable for component (B) to be based on a straight-chain structure, the molecule may include branched structures that start at trifunctional siloxane and/or tetrafunctional siloxane units or may have a cyclic structure.

The specific structure of component (B) is exemplified by structures of the following formula (7).

[Chemical Formula 9]

(7)

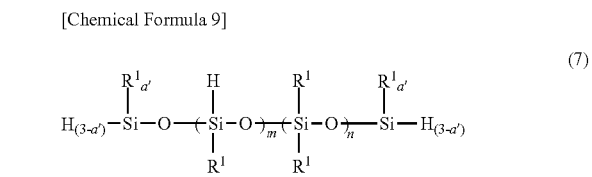

Here, $R^1$ is as defined above; a' is an integer from 0 to 3, and preferably from 0 to 2; and m and n are integers such that from 5 to 50 mol % of all the groups directly bonded to silicon atoms are hydrogen atoms and the viscosity at 25° C. is from 0.005 to 1 Pa·s.

In above formula (7), $R^1$ is as defined above, with a methyl group or phenyl group being preferred. From a practical standpoint, it is more preferable for at least 80 mol % to be methyl groups.

Illustrative examples of component (B) include, but are not limited to, those having the following formulas. In the following formulas, each "Me" stands for a methyl group.

[Chemical Formula 10]

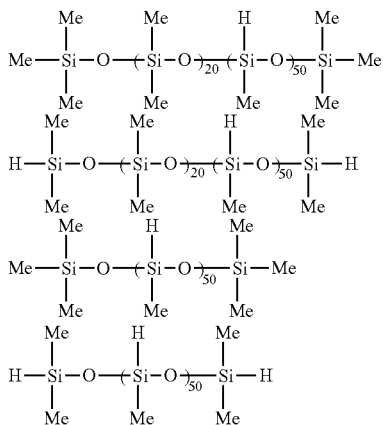

The content of component (B) is an amount corresponding to a number of moles of the Si—H groups in component (B) that is from 0.5 to 10 times, and preferably from 0.7 to 10 times, the number of moles of alkenyl groups in component (A). When the number of moles of Si—H groups is too low, the curability of the composition is inadequate; when it is too high, the pot life shortens.

In addition, in this invention, the total number of moles of Si—H groups included in the composition is preferably an amount corresponding to from 0.5 to 9 times, and more preferably an amount corresponding to from 0.7 to 8 times, the total number of moles of alkenyl groups included in the composition.

[Component (C)]

The organopolysiloxane emulsion composition of the invention includes a curing catalyst as component (C). This component is used as a catalyst for inducing an addition reaction between the alkenyl groups in component (A) and subsequently described component (E) and the Si—H groups in component (B).

This curing catalyst is exemplified by platinum-based complexes (e.g., complexes of a polysiloxane or a vinyl group-containing polysiloxane with platinum, a platinum compound or a platinum-based metal; and complex salts of chloroplatinic acid with various olefins).

It is desirable to use, as component (C), a platinum-based complex-containing vinyl group-containing polysiloxane in liquid form. The platinum-based complex-containing vinyl group-containing polysiloxane has a viscosity at 25° C. which is preferably from 10 mPa·s to 1 Pa·s.

The content of component (C) is from 0.01 to 3 parts by weight, and preferably from 0.01 to 2.5 parts by weight, per 100 parts by weight of component (A). In terms of the platinum group metal equivalent weight per 10) parts by weight of component (A), inclusion in a range of from 0.001 to 0.1 part by weight, and especially from 0.001 to 0.05 part by weight, is preferred. At a component (C) content which is too low, the curability of the composition decreases; at a component which is too high, the pot life shortens.

In this invention, in the subsequently described production method, as a way of improving the stability of the silicone emulsion particles, it is preferable to prepare the organopolysiloxane emulsion composition of the invention by first preparing separate emulsion compositions of component (B) and component (C), and then mixing these together. Preparing separate emulsion compositions of component (B) and component (C) has the advantage of enabling the curing catalyst to be easily and rapidly dispersed uniformly within the emulsion composition, as a result of which a good performance by the cured coat can be stably obtained. This is also advantageous for improving the shelf life and the pot life.

[Component (D)]

Component (D) is a polyether-modified and/or polyol-modified organosilicon compound. This has the effects of improving wettability when the organopolysiloxane emulsion composition of the invention is applied to various types of substrates, and of improving the leveling ability of the cured coat that has been applied.

Although a compound which contains both a hydrophobic moiety and a hydrophilic moiety within a single molecule has these effects, the structure suitable for obtaining the target effects is known to vary depending on the composition within which this compound is included. Because the organopolysiloxane emulsion composition of the invention is an oil-in-water (O/W) type emulsion, in order to improve the wettability and leveling ability when the organopolysiloxane emulsion composition is applied onto a substrate, it is desirable for this compound to be present primarily in the aqueous phase that is the continuous phase of the emulsion, and for the compound to show a tendency to collect near interfaces between this aqueous phase and the atmosphere or the substrate. Therefore, while it is fundamental to component (D) that it have a hydrophilic structure which can maintain a stable solubility and dispersibility in water, it is desirable to select a molecular structure which also has a hydrophobic structure that enables a concentration-segregating layer where component (D) is present in a higher concentration than at the interior of the aqueous phase to form at interfaces where the aqueous phase in which component (D) is dissolved comes into contact with the atmosphere or the substrate. A hydrophobic structure is introduced within a range that does not greatly compromise the water solubility, although it is not always necessary to achieve a uniformly transparent aqueous solution, so long as it has long-term stability in a clouded or slightly murky state and shows no tendency for separation. Also, in the organopolysiloxane emulsion composition of the invention, because a platinum catalyst or other addition reaction curing catalyst is used as the curing catalyst, it is essential to select a hydrophilic structure which does not hinder this reaction. For these reasons, an ether bond or hydroxyl group-containing structure is preferred as the hydrophilic moiety.

After the organopolysiloxane emulsion composition of the invention has cured, substantially no water remains within the cured coat, which is composed primarily of hydrophobic silicone. Hence, when the solubility and dispersibility of component (D) having a hydrophilic structure decreases and separation/agglomeration occurs, this may cause the appearance of the cured coat to cloud. It is desired that component (D) have a hydrophobic structure which does not hinder stable solubility/dispersibility within the aqueous phase and can suppress separation/agglomeration within the cured coat, and is especially preferable for component (D) to have, as the hydrophobic structure, a siloxane or to silane of excellent solubility/dispersibility with silicone. Compared with other hydrophobic structures, this is more effective for improving the appearance/transparency of the cured coat. It is still more desirable for the degree of polymerization of the siloxane structure to be 100 or less; in excess of this, the decrease in solubility/dispersibility in the aqueous phase becomes greater.

It is also possible to additionally include a compound having a higher hydrophilicity and a low hydrophobicity so as to contribute to the solubility/dispersibility of component (D) in the aqueous phase, or to additionally include a compound having a lower hydrophilicity and a high hydrophobicity in order to further improve the dispersibility of component (D) within the cured coat. In such cases, the compound that is additionally included does not necessarily have to be a compound which satisfies the requirements for component (D).

In addition, component (D) may have a group that is capable of an addition reaction and/or a dehydrogenation or dehydration reaction with component (A), component (B) and subsequently described component (E). By reaction with other components in the composition, the tendency of component (D) to separate/agglomerate within the cured silicone product is effectively suppressed, enabling the appearance/transparency of the cured coat to be further improved.

For the above reasons, a polyether-modified and/or polyol-modified organosilicon compound is used as component (D).

Preferred structures for the polyether-modified and/or polyol-modified organosilicon compound include those shown in the following general formulas (8) to (10).

from 0 to 3, preferably 2 or 3; o3+p3 is an integer from 0 to 3, preferably 2 or 3; when o+p is 3, s is 1 or more; and when o2+p2 and o3+p3 are each 3, v1 or v2 is 1 or more.

In formulas (8) to (10), the $R^1$ groups are as defined above and may be the same or different. Methyl and phenyl groups are especially preferred.

$R^3$ is a hydrogen atom, a hydroxyl group, an alkoxy group of 1 to 4 carbon atoms, or a substituted or unsubstituted alkenyl group of 2 to 20 carbon atoms. Examples of the alkoxy group of 1 to 4, and preferably 1 to 3, carbon atoms include methoxy, ethoxy, propoxy and butoxy groups. Examples of substituted or unsubstituted alkenyl groups of 2 to 20 carbon atoms include the same as those mentioned above for $R^2$. $R^3$ is preferably a hydroxyl, vinyl, methoxy or propoxy group.

$R^4$ is a monovalent hydrophilic group, preferably a hydrophilic monovalent organic group containing an ether bond and/or a hydroxyl bond, and more preferably is selected from groups of the following formulas.

Ether

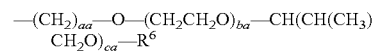

Glycerol

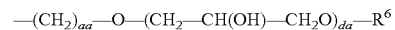

In these formulas, $R^6$ is a substituted or unsubstituted monovalent hydrocarbon group of 1 to 10 carbon atoms without an aliphatic unsaturated bond, or a hydrogen atom; aa is an integer from 1 to 10, preferably from 1 to 5; ba and ca are each integers from 0 to 20, preferably from 1 to 10; ba+ca is an integer from 1 to 20, preferably from 2 to 20; and da is an integer from 1 to 20, preferably from 1 to 10.

Here, $R^6$ is a substituted or unsubstituted monovalent hydrocarbon group of 1 to 10 carbon atoms without an aliphatic unsaturated bond, or a hydrogen atom. Examples of

[Chemical Formula 1]

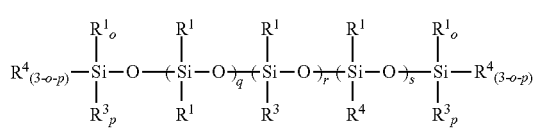

(8)

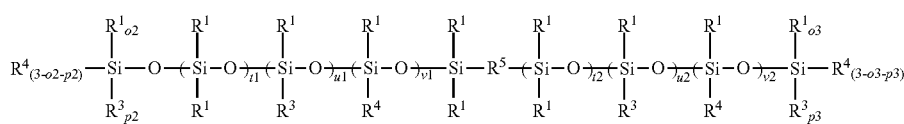

(9)

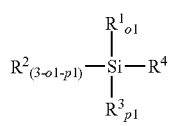

(10)

In these formulas, $R^1$ and $R^2$ are as defined above; each $R^3$ is independently a hydrogen atom, a hydroxyl group, an alkoxy group of 1 to 4 carbon atoms, or a substituted or unsubstituted alkenyl group of 2 to 20 carbon atoms; each $R^4$ is independently a monovalent hydrophilic group; $R^5$ is a divalent hydrophilic group; q, r, s, t1, t2, u1, u2, v1 and v2 are integers of 0 or more; q+r+s and t1+u1+v1+t2+u2+v2 are each integers from 0 to 98, preferably from 0 to 50; o and o1 to o3 are integers from 0 to 3, preferably from 1 to 3; p and p1 to p3 are integers from 0 to 3, preferably 0 or 1; o+p is an integer from 0 to 3, preferably 2 or 3; o1+p1 is an integer from 0 to 3, preferably 2 or 3; o2+p2 is an integer the substituted or unsubstituted monovalent hydrocarbon groups without an aliphatic unsaturated bond include the same as those mentioned above for $R^1$. $R^6$ is preferably a hydrogen atom, a methyl group, an ethyl group, a propyl group or a butyl group.

In above formula (9), $R^5$ is a divalent hydrocarbon group, preferably a hydrophilic divalent organic group that includes an ether bond and/or a hydroxyl group, and more preferably a divalent group with a structure that, in a group represented by the above formulas for $R^4$, has been placed in a chemically bondable state by removing at least one hydrogen atom bonded to a carbon atom.

Specific examples of component (D) include the groups having the following formulas. In these formulas, each "Me" stands for a methyl groups.

[Chemical Formula 12]

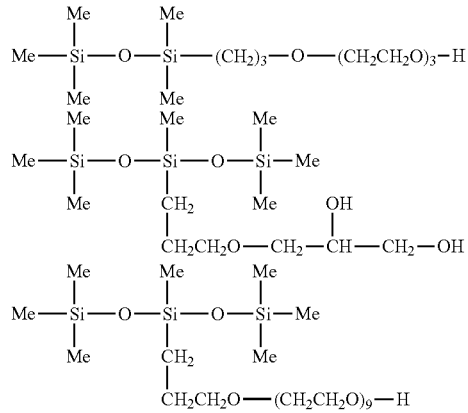

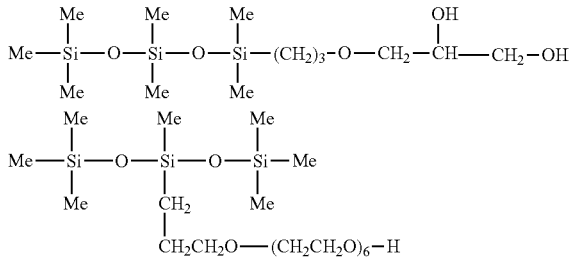

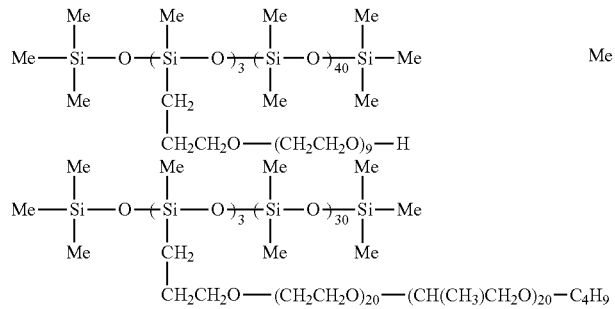

[Chemical Formula 13]

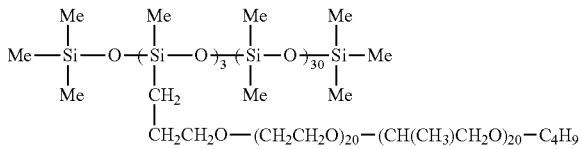

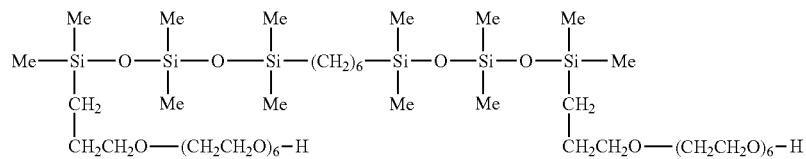

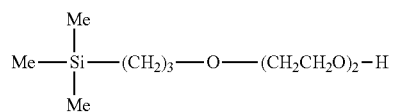

Component (D) may be of one type used alone, or two or more types may be used in admixture.

The content of component (D) per 100 parts by weight of component (A) is from 0.01 to 10 parts by weight, and preferably from 0.05 to 10 parts by weight. When the content of component (D) is too low, the wettability-improving effect and the cured coat smoothness-enhancing effect are too small; when the content is too high, the transparency of the cured coat decreases.

[Component (E)]

Component (E) is an organopolysiloxane resin composed primarily of M units of formula (1) below and Q units of formula (2) below in a molar ratio of M units to Q units (M/Q) in the range of 1/9 to 9/1.

[Chemical Formula 14]

[Chemical Formula 15]

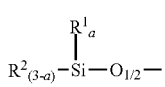 (1)

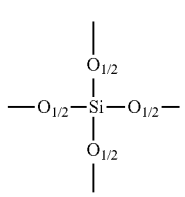 (2)

In these formulas, $R^1$, $R^2$ and the letter a are as defined above, and $O_{1/2}$— indicates that another unit is bonded through $O_{1/2}$—.

In above formulas (1) and (2), $R^1$ is as defined above, with a methyl or phenyl group being especially preferred.

Also, $R^2$ is as defined above, with a vinyl group being especially preferred.

Organopolysiloxane resins of this structure are known as tight release control agents in silicone compositions for release paper and as starting materials for silicone pressure-sensitive adhesives. However, even when included in the organopolysiloxane emulsion composition of the invention, they show substantially no effect as a tight release control agent. Instead, cured coat appearance/transparency and surface smoothness-improving effects were found to be obtained. Although the reasons for this have not been confirmed, it is conjectured that the hydrophilic structure acts in such a way as to cause component (D) and subsequently described component (G) which have a low solubility/dispersibility in silicone to dissolve/disperse in the silicone cured coat. Although coat appearance/transparency and surface smoothness-enhancing effects are exhibited even in organopolysiloxane emulsion compositions that do not include component (E), even higher effects can be obtained with the concomitant use of component (E).

The molar ratio M/Q between the M units and Q units in component (E) is in the range of 1/9 to 9/1, preferably in the range of 2/8 to 8/2, and more preferably in the range of 3/7 to 7/3. When the molar ratio is smaller than 1/9, the viscosity of the reaction product becomes too high, making synthesis difficult. When the molar ratio exceeds 9/1, a high degree of polymerization cannot be achieved, and so the cured coat appearance/transparency-improving effect decreases.

Component (E) may include silicon-bonded hydroxyl groups or hydrolyzable groups such as alkoxy groups.

Although this organopolysiloxane resin need not invariably have alkenyl groups, when one wishes to increase the subsequent adhesion ratio of the cured coat and/or minimize silicone migration from the cured coat, it is effective to provide alkenyl groups on the resin. In such cases, the alkenyl group content is preferably from 0.01 to 0.5 mol/100 g, and especially from 0.02 to 0.2 mol/100 g. At an alkenyl group content that is too low, the effect of increasing the subsequent adhesion ratio and/or minimizing silicone migration may not be obtainable. At a content that is too high, the release force becomes tight.

The content of hydroxyl groups or hydrolyzable groups in the organopolysiloxane resin is preferably from 0.001 to 0.1 mol/100) g, and especially from 0.005 to 0.05 mol/100 g.

Also, the organopolysiloxane resin has a viscosity at 25° C., as a 60 wt % solution in toluene, of preferably from 1 to 50 mPa·s, and especially from 2 to 40 mPa·s. When the viscosity is higher than this range, the release force may become tight; when the viscosity is lower than this range, the cured coat transparency and smoothness-improving effects may diminish.

Component (E) having a high degree of polymerization is a solid, although a liquid component (E) having a low degree of polymerization may be concomitantly used, or component (E) may be used in a method that entails, for example, dissolution in another ingredient that is a liquid. Use by dilution in a solvent is also possible, although this is undesirable in that it compromises the safety, solventless nature and other features of the organopolysiloxane emulsion composition. However, in cases where particular importance is attached to coatability, wettability, film formability and the like for industrial reasons, dilution with a solvent is effective and is not excluded here as a possibility. In such cases, it is preferable to select a relatively safe alcohol, ether, ketone, ester or carboxylic acid-type solvent.

When component (E) is included, the content thereof, per 100 parts by weight of component (A), is preferably from 0.1 to 10 parts by weight, and more preferably from 0.2 to 5 parts by weight. When the content of component (E) is too small, the cured coat transparency and smoothness-improving effects may diminish; when the content is too large, the release force of the cured coat may become tight.

[Component (F)]

The organopolysiloxane emulsion composition of the invention may additionally include, as component (F), an adhesion promoter.

The adhesion promoter that may be used in this invention is preferably an organopolysiloxane resin composed primarily of, for example, ($R^1SiO_{3/2}$) units (T units) and ($R^1_aR^2_{(3-a)}SiO_{1/2}$) units (M units) (wherein $R^1$, $R^2$ and the letter a are as defined above) in a molar ratio of M units to T units (M/T) in the range of 1/9 to 9/1.

In this organopolysiloxane resin, the molar ratio of M units to T units (M/T) is in the range of 1/9 to 9/1, preferably the range of 2/8 to 8/2, and more preferably the range of 3/7 to 7/3. When this molar ratio is smaller than 1/9, the viscosity of the reaction product becomes too high, which may make synthesis difficult. When the molar ratio exceeds 9/1, a high degree of polymerization cannot be achieved, and so the adhesion-promoting effect may decrease.

An organopolysiloxane resin of this structure can be utilized as a good adhesion promoter. In the M unit formula, the letter a is as defined above. However, it is desirable for one molecule of the organopolysiloxane resin serving as component (F) to include two or more $R^2$ groups. With fewer such groups, the adhesion-promoting effect may decrease. The M units are more preferably used in such a way that the molar ratio of ($R^1_3SiO_{1/2}$) units/($R^1_2R^2SiO_{1/2}$) units is in the range of 0/10 to 7/3. At a ratio larger than 7/3, the adhesion-promoting effect may decrease.

This organopolysiloxane resin may include silicon-bonded hydroxyl groups or hydrolyzable groups such as alkoxy groups.

Here, this organopolysiloxane resin has an alkenyl group content that is preferably from 0.01 to 0.7 mol/100 g, and especially from 0.02 to 0.6 mol/100 g. When the alkenyl group content is too small, the adhesion-promoting effect may diminish; when it is too large, the release force of the cured coat may become tight.

Also, the hydroxyl or hydrolyzable group content in this organopolysiloxane resin is preferably from 0.005 to 0.1 mole/100 g, and especially from 0.005 to 0.05 mol/100 g.

This organopolysiloxane resin has a viscosity at 25° C. of preferably from 1 to 500 mPa·s, and especially from 2 to 200 Pa·s. At too high or too low a viscosity, the cured coat adhesion-promoting effect may decline.

Illustrative examples of such organopolysiloxane resins include the following compounds. In the formulas shown below, Me and V stand for, respectively, a methyl group and a vinyl group.

[Chemical Formula 16]

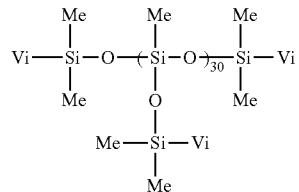

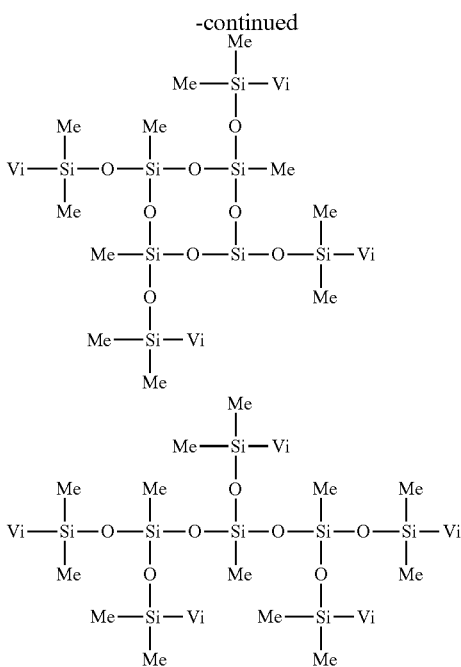

When this organopolysiloxane resin is used in the organopolysiloxane emulsion composition of the invention, it is preferable to concomitantly use component (B) containing a number of moles of Si—H groups that is the same as or higher than the number of moles of $R^2$ contained in component (F) included in the composition. In this way, a good curability can be obtained.

Other compounds that may be used as component (F) include compounds that are commonly known as silane coupling agents; reaction products and partial hydrolytic condensation products of these may also be used. Specific examples include compounds having both a hydrolyzable silyl group and an organic functional group on one molecule. Exemplary hydrolyzable groups include alkoxy, propenoxy and acetoxy groups, with alkoxy groups being preferred; examples of the latter include methoxy, ethoxy, propoxy and butoxy groups. Exemplary organic functional groups include amino groups, amide groups, epoxy groups; alkenyl groups such as vinyl, propenyl and butenyl groups; and acryloyloxy groups and methacryloyloxy groups. Epoxy groups are preferred because they do not affect the addition reaction.

Examples of such silane coupling agents include 3-glycidoxypropyltrimethoxysilane, 3-glycidoxypropylmethyldimethoxysilane, 3-glycidoxypropyltriethoxysilane, 2-(3,4-epoxycyclohexyl)ethyltrimethoxysilane and 1,3-di(3-glycidoxypropyl)-1,3-dimethyl-1,3-dimethoxydisiloxane, as well as partial hydrolytic condensation products of these monomers.

The silane coupling agent may be used as is, although it may also be used after hydrolyzing the hydrolyzable group within the silane coupling agent and converting it to a silanol group. That is, silane coupling agents themselves often are not water-soluble, but even those which are not water-soluble can easily be added to an emulsion composition by hydrolyzing the hydrolyzable group and converting it to a silanol group. One known method for doing so is to add a small amount of a water-soluble carboxylic acid to water so as to prepare a weakly acidic aqueous solution, and then mix and stir a suitable amount of this solution together with the silane coupling agent so as to prepare an aqueous solution or dispersion of the silane coupling agent. By using also such methods as including an alcohol or other water-soluble solvent, adding a surfactant, heating to the vicinity of 50° C., or changing the pH by varying the type of carboxylic acid, it is possible to prepare aqueous solutions or dispersions for a broad range of silane coupling agent types. The resulting aqueous solution or dispersion of a silane coupling agent may be used by adding it to the emulsion composition of the invention. In cases where it is difficult to prepare an aqueous solution or dispersion in this way, the silane coupling agent may be prepared as an emulsion in the same way as that used to obtain the emulsion composition of the invention, and then added to the emulsion composition of the invention. In cases where the emulsion composition of the invention is weakly acidic, the silane coupling agent can be uniformly dissolved or dispersed even by direct addition to and stirring with the emulsion composition.

When component (F) is included, the content thereof per 100 parts by weight of component (A) is preferably from 0.1 to 50 parts by weight, and especially from 0.2 to 30 parts by weight. When the content of component (F) is too small, the adhesion-promoting effect may diminish; when it is too large, the release force of the cured coat may become tight.

[Component (G)]

In this invention, an emulsifying agent (G) may be included as an ingredient that assists in the production of organopolysiloxane emulsion compositions. Emulsifying agents effective for producing emulsion compositions are commonly known; any commercially available surfactant or polymeric surfactants may be selected and used, provided that it does not detract from the inherent performance of the inventive organopolysiloxane emulsion composition. In general, nonionic surfactants and water-soluble polymers such as polyvinyl alcohols, polyvinyl ethers, methyl cellulose, carboxymethyl cellulose and modified starches, as well as derivatives thereof, may be advantageously used.

In addition, cationic or anionic surfactants may be concomitantly used, provided that they do not have an adverse influence on the advantageous effects of the inventive organopolysiloxane emulsion composition. With the concomitant use of such surfactants, the wettability and leveling ability can be expected to improve.

Illustrative examples of nonionic surfactants that may be used include alkyl phenyl ether-type compounds such as polyoxyethylene nonyl phenyl ether and polyoxyethylene octyl phenyl ether, alkyl ether-type compounds such as polyoxyethylene lauryl ether and polyoxyethylene tridecyl ether, aryl phenyl ether-type compounds such as polyoxyethylene styrenated phenyl ether and polyoxvethylene distyrenated phenyl ether, alkyl esters such as polyoxyethylene oleate and polyoxvethylene laurate, and sorbitan fatty acid esters such as polyoxyethylene sorbitan monolaurate and polyoxyethylene sorbitan tristearate. From the standpoint of emulsifiability and safety, polyoxyethylene alkyl ethers and polyoxyethylene aryl phenyl ethers are preferred.

Water-soluble polymers such as polyvinyl alcohols, polyvinyl ethers, methyl cellulose, carboxymethyl cellulose and modified starches, as well as derivatives thereof, are commonly known as polymeric surfactants which, in addition to having a surfactant action, also have thickening and protective colloid effects. Such water-soluble polymers may be selected from among commercially available products and used.

Polyvinyl ethers which have a good water solubility and a clouding point of at least 90° C. are suitable. Preferred use can be made of partially saponified polyvinyl ethers having a degree of saponification of from 75 to 95, a viscosity as a 4 wt % aqueous solution of from 10 to 50 mPa·s, and a degree of polymerization of from 1,000 to 3,000. Modified polyvinyl ethers in which pendant hydroxyl groups and ester groups on the polyvinyl ether are partially substituted with substituents that have little effect on the addition reaction, such as acetoacetyl groups, polyether groups (e.g., polyethylene oxide, polypropylene oxide), and alcoholic substituents (e.g., carbinol, glycol) may also be used. Because commercially available polyvinyl ethers sometimes contain impurities such as carboxylates, which may have an influence on the stability and curability of the emulsion, one having a purity of at least 90%, and preferably at least 95%, is used.

Methyl cellulose is a compound obtained by substituting some of the hydrogen atoms on the hydroxyl groups of cellulose with methyl groups and thereby rendering it water-soluble. Aside from methyl groups, it is also possible to form water-soluble cellulose ethers using substituents such as hydroxyethyl or hydroxypropyl groups. The viscosity as a 2 wt % aqueous solution is preferably in the range of 4 to 10,000 mPa·s.

Of the above, nonionic surfactants having a hydrophilic-lipophilic balance (HLB) of from 9 to 16 and a pH of 8 or less, and polymeric surfactants having a degree of saponification of from 85 to 98 mol % and a viscosity at 20° C., as a 4 wt % aqueous solution, of from 0.004 to 0.1 Pa·s are excellent for the stability of the resulting organopolysiloxane emulsion composition.

When component (G) is included, the content thereof per 100 parts by weight of component (A) is preferably from 0.1 to 20 parts by weight, and especially from 0.2 to 15 parts by weight. At less than 0.1 part by weight, the advantageous effects of component (G) addition may not be obtained and the shelf life of the organopolysiloxane emulsion composition may not improve. At more than 20 parts by weight, the curability of the organopolysiloxane emulsion composition of the invention may decrease.

[Component (H)]

The pot-life extender serving as component (H) is an optional ingredient included as a regulator for improving the pot life of the organopolysiloxane emulsion composition in which the curing catalyst has been added and mixed. In this invention, when used together with a technique that employs conventional regulators, a longer pot life and also cured coat appearance/transparency and surface smoothness-improving effects can be obtained.

In the case of addition curable-type compositions, an activity inhibitor such as any of various organic nitrogen compounds, organophosphorus compounds, acetylene compounds and alkenyl group-containing siloxane compounds is optionally selected and used for the purpose of suppressing the activity of the platinum-based complex catalyst.

Specific examples of component (H) include 3-methyl-1-butyn-3-ol, 3-methyl-1-pentyn-3-ol, 3,5-dimethyl-1-hexyn-3-ol, ethynylcyclohexanol (1-ethynyl-1-cyclohexanol), 3-methyl-3-trimethylsiloxy-1-butyne, 3-methyl-3-trimethylsiloxy-1-pentyne, 3,5-dimethyl-3-trimethylsiloxy-1-hexyne, 1-ethynyl-1-trimethylsiloxycyclohexane, bis(2,2-dimethyl-3-butynoxy)dimethylsilane, 1,3,5,7-tetramethyl-1,3,5,7-tetravinylcyclotetrasiloxane, 1,1,3,3-tetramethyl-1,3-divinyldisiloxane, maleic acid esters and adipic acid esters.

The content of component (H), which is adjusted according to the compound selected and the conditions of use and therefore is not always necessary, is generally from 0.01 to 10 parts by weight per 100 parts by weight of component (A). At less than 0.01 part by weight, the advantageous effects of including component (H) may not be observable, whereas at more than 10 parts by weight, the curability may decline.

[Various Additives]

Various types of additives may be included in the organopolysiloxane emulsion composition of the invention, provided that doing so does not detract from the advantageous effects of the invention. For example, sorbic acid, benzoic acid, salicylic acid, acetic acid and salts thereof, as well as isothiazoline compounds, may be added to prevent spoilage; water-soluble resins such as methyl cellulose and sodium carboxymethyl cellulose may be added to prevent infiltration into porous substrates; and leveling agents and small amounts of solvent may be added to improve leveling during application. In addition, a small amount of a non-reactive organopolysiloxane or the like may be optionally added as a slip-imparting agent.

[Production]

The organopolysiloxane emulsion composition of the invention can be obtained by uniformly mixing together given amounts of each component and adding water to the mixture, followed by mechanical emulsification with a commonly used emulsifying apparatus such as a homogenizer or a dispersion mixer.

The amount of water used here is not particularly limited, although from 100 to 100,000 parts by weight can typically be used per 100 parts by weight of the mixture. At less than 100 parts by weight, the resulting emulsion may become highly viscous and difficult to handle. At more than 100,000 parts by weight, the stability of the emulsion may decrease.

Typically, in order for the emulsion composition to have a good shelf life and pot life, use is generally made of a method in which the crosslinking agent and curing catalyst. i.e., component (B) and component (C) in this invention, are prepared separately as emulsion compositions, and the two compositions are mixed together just prior to use. In cases where, with this approach alone, the pot life is short, a practical pot life can be achieved by additionally using a pot life extender, i.e., component (H) of the invention. However, even using these conventional methods, in release films for which transparency is particularly important, clouding in the appearance of the cured coat sometimes arises over the course of the pot life.

By using the organopolysiloxane emulsion composition of the invention, the transparency of the cured coat improves, making it possible to avoid this problem. Artful modification of the production method enables the improvement effect to be further increased, making it possible to reliably prevent changes in the appearance of cured coats over the course of the pot life.

The production method entails preparing:

Emulsion Composition 1 obtained by dispersing in water a mixture containing component (B), lacking component (C), and optionally containing some or all of component (A), components (D) to (H), and other ingredients, and Emulsion Composition 2 obtained by dispersing in water a mixture containing component (C), lacking component (B), and additionally containing the remaining components, such that the sum of the silicone components in Composition 2 is 3 parts by weight or less per 100 parts by weight of the sum of the silicone components in Compositions 1 and 2; and mixing together Compositions 1 and 2 just prior to use. In this way, the organopolysiloxane emulsion composition of the invention can be prepared.

The advantage of such a composition in which the components are divided into two liquids is that component (B), the reaction of which proceeds with particular ease under the catalytic action of component (C), is separated off so as not to come into contact with component (C), thus enabling the reaction to be reliably stopped until just before the time of use. Although using this method creates the need for a liquid-preparing operation in which Composition 1 and Component 2 are mixed together, a good shelf life that is excellent for long-term performance stability where storage is intended can be achieved. Even within the composition following the liquid-preparing operation, because the component (B)-containing Composition 1 emulsion particles and the component (C)-containing Composition 2 emulsion particles are dispersed within the aqueous phase while remaining apart as separate emulsion particles, the reaction does not immediately proceed, which is effective also for extending the pot life following mixture. However, with the passage of time, the coalescence of component (B)-containing Composition 1 emulsion particles with component (C)-containing Composition 2 emulsion particles proceeds. Within the emulsion particles that form as a result, addition reactions begin to take place, shortening the pot life. If component (H) is included, the reaction can be kept from proceeding, but there are limits to this effect under conditions that lower the stability of the emulsion particles, such as high temperature, high concentration or the application of high shear. If the stability of the emulsion particles is improved and coalescence itself is suppressed, the pot life can be improved. It has hitherto been noted that there exists a relationship between the stability of emulsion particles and their size, with the stability being higher at smaller particle sizes. However, from the standpoint of the progression of addition reactions in an emulsion, JP No. 4823403 (Patent Document 1) describes setting the volume-average particle size of an emulsion-type hydrosilylation reaction catalyst that is a platinum-alkenyl siloxane complex to 1 μm or below, and it is commonly known that catalyst-containing emulsion particles have a higher catalytic action the smaller the size of the particles. Component (C)-containing Emulsion Composition 2 in the present invention corresponds to this catalyst-containing emulsion, and so, expecting that a larger particle size would be advantageous for suppressing the reactions, we tried changing the particle size of the emulsion. However, results advantageous to extending the pot life were not obtained. It would appear that, under the high-temperature, high-concentration, high-shear and other conditions harsh to the stability of emulsion particles that the organopolysiloxane emulsion composition of this invention is used, the emulsion particle size does not have a sufficient effect. We then tried reducing the number of emulsion particles within component (C)-containing Emulsion Composition 2, whereupon results effective for extending the pot life were obtained. We discovered in particular that this is effective for suppressing the decrease in transparency of the cured coat over the course of the pot life. This in fact lowers the amount of silicone components in component (C)-containing Emulsion Composition 2 as a proportion of the total amount of silicone components, with the respective compositions being prepared such that the sum of the silicone components in Composition 2 becomes 3 parts by weight or less, preferably from 0.1 to 2 parts by weight, and more preferably from 0.1 to 1 part by weight, per 100 parts by weight of the sum of the silicone components in Compositions 1 and 2. When the sum of the silicone components in Composition 2 exceeds 3 parts by weight, the pot life-extending effect may decrease. In this invention, "silicone components" refers to above components (A) to (F).

Alternatively, a composition may be used in which the components are divided into three liquids, these being the above component (B)-containing Emulsion Composition 1 and component (C)-containing Emulsion Composition 2 and, additionally, an Emulsion Composition 3 containing Component (D) and other performance-imparting additives having various advantageous effects.

The advantages of such a composition in which the components are divided into three liquids include the fact that, as mentioned above, component (B) and component (C) are included in separate emulsion compositions, ensuring a shelf life, and the fact that the number of emulsion particles in the component (C)-containing emulsion composition is reduced, enabling the pot life to be extended. An additional and outstanding advantage is that, by separately preparing, as a performance-imparting additive, Emulsion Composition 3 which contains components selected from above components (D) to (H), the organopolysiloxane emulsion composition of the invention can be adjusted to a suitable wettability by merely changing the Composition 3 content in accordance with the substrate and coating apparatus to be used, thus making it possible to improve the surface smoothness and transparency of the cured coat, enhance the adhesive properties, and extend the pot life.

Such a production method is exemplified by the following method.

The organopolysiloxane emulsion composition of the invention is produced by preparing:
Emulsion Composition 1' obtained by dispersing in water a mixture containing component (B), lacking components (C) and (D), and optionally containing some or all of component (A) and components (E) to (H),
Emulsion Composition 2' obtained by dispersing in water a mixture containing component (C), lacking components (B) and (D), and optionally containing some or all of component (A) and components (E) to (H), and
Emulsion Composition 3' obtained by dispersing in water a mixture containing component (D), lacking component (B) and/or component (C), and additionally containing the remaining above components,
such that the sum of the silicone components in Composition 2' becomes 3 parts by weight or less, preferably from 0.1 to 2 parts by weight, and more preferably from 0.1 to 1 part by weight, per 100 parts by weight of the sum of the silicone components in Compositions 1', 2' and 3'; and mixing together Compositions 1', 2' and 3' just prior to use.

When the sum of the silicone components in Composition 2' is more than 3 parts by weight per 100 parts by weight of the sum of the silicone components in Compositions 1', 2' and 3', the pot life-extending effect may be smaller.

The average particle sizes of the emulsion particles in above Emulsion Compositions 1 to 3 and in the organopolysiloxane emulsion composition of the invention are not particularly limited, although the particle size is preferably not more than 1,000 nm, more preferably not more than 800 nm, and even more preferably not more than 600 nm. There is no particular lower limit, although the particle size is typically at least about 50 nm. The average particle sizes of the emulsion particles is the volume-average diameter measured using a photon correlation technique based on dynamic light scattering. When these average particle sizes exceed 1,000 nm, the shelf life may shorten; when less than 50 nm, industrially, the production efficiency may decrease. Regardless of the above particle size range, when the emulsion particle sizes among Emulsion Compositions 1 to 3 to be mixed together differ to a large degree, the shelf life and pot life may be shorter.

[Method of Use]

By applying the inventive organopolysiloxane emulsion composition obtained as described above onto one or both sides of a substrate such as paper or plastic film, and using a method such as heat curing or UV curing to cure the applied composition, one can obtain release paper or release film in which an applied coat made of the cured form of the inventive organopolysiloxane emulsion composition has been formed on a paper or film substrate. This can be used as release paper or release film which adheres well to paper or a substrate and has good release properties with respect to pressure-sensitive adhesives. Release paper and release film obtained with the organopolysiloxane emulsion composition of the invention have the advantage of being able to achieve a stable performance.

In this invention, use can also be made of a coating liquid prepared by adding the organopolysiloxane emulsion composition of the invention to a commercial silicone emulsion composition for release paper or release film, and mixing the compositions together. An advantage of this method is that it can address diverse performance requirements. In this case, the organopolysiloxane emulsion composition of the invention is added within a range that does not detract from the performance of the commercial silicone emulsion composition. As a rule of thumb, it is preferable to carry out addition such that the silicone components within the organopolysiloxane emulsion composition of the invention, i.e., the sum of components (A) to (F), is not more than 100 parts by weight, preferably from 0.1 to 50 parts by weight, and more preferably from 1 to 40 parts by weight, per 100 parts by weight of the sum of silicone components within the commercial silicone emulsion composition. At more than 100 parts by weight, the performance of the commercial silicone emulsion composition may be compromised; at less than 0.1 part by weight, obtaining the appearance/transparency and smoothness-improving effects of the applied coat of the invention may be difficult.

[Substrate]

Illustrative examples of paper substrates include glassine paper, kraft paper, clay-coated paper, and also laminated papers such as polyethylene laminated woodfree paper and polyethylene laminated kraft paper. The thickness of these paper substrates is not limited, although use can typically be made of a paper substrate having a thickness of about 50 to 1,000 μm.

Illustrative examples of plastic film substrates include polyolefin films such as biaxially oriented polypropylene film polyethylene film and ethylene-propylene copolymer film; and polyester films such as polyethylene terephthalate, polybutylene terephthalate and polyethylene naphthalate. The thickness of these plastic film substrates is not limited, although use can typically be made of a plastic film substrate having a thickness of about 2 to 100 μm.

[Application and Curing]

Any method may be used to apply the organopolysiloxane emulsion composition of the invention onto a substrate. For example, application may be carried out by roll coating, gravure coating, air knife coating, wire coating, doctor coating and brush coating.

With regard to the curing method, in the case of heat curing, a cured coat having the desired release properties is formed by coating the organopolysiloxane emulsion composition of the invention to a thickness, expressed in terms of the solids, of from 0.01 to 5 g/m² onto a substrate such as paper or plastic film, and then using a heating roll, heating drum or circulating hot-air dryer to treat the applied composition for a period of from 5 seconds to 3 minutes at 80 to 200° C.

In the case of UV curing, the organopolysiloxane emulsion composition of the invention is applied onto a substrate such as paper or plastic film to a thickness, in terms of the solids, of from 0.01 to 5 g/m², treated for a period of from 5 seconds to 1 minute at 80 to 150° C. using a heating roll, heating drum or circulating hot-air dryer, and subsequently irradiated using a UV irradiation unit at a total dose of 10 to 500 mJ/cm², such as with one or two 120 W lamps, and at a line speed of 10 to 100 m/min. UV irradiation may be carried out at the same time as heating, although carrying these out separately has the advantage that the equipment can be made simpler. Also, there may be cases in which carrying out UV irradiation after heating or carrying out heating after UV irradiation is more effective. UV irradiation units that may be used include commercial lamps and bulbs, such as mercury vapor lamps, metal halide lamps, and fusion lamps. By treatment in this way, a cured coat having the desired release properties is obtained.

In-line coating with the organopolysiloxane emulsion composition may be performed on a biaxial stretching line during film production. For example, the organopolysiloxane emulsion composition can be applied when the first stretching operation is complete and before the second stretching operation.

EXAMPLES

The invention is concretely illustrated below by way of Examples and Comparative Examples, although the invention is not limited by these Examples. The viscosities mentioned below are all absolute viscosities measured at 25° C. with a Brookfield rotational viscometer. The vinyl group content, Si—H group content and silanol group content are values determined by $^{29}$Si-NMR spectroscopy. In the examples below, "Me" and "Vi" stand for, respectively, a methyl group and a vinyl group.

Examples 1 to 22, Comparative Examples 1 to 3

<Starting Materials Used in the Composition>

Component (A)

A1: A straight-chain dimethylpolysiloxane which is capped at both ends with vinyldimethylsiloxy units ($M^V$ units) of the formula $Me_2(Vi)SiO_{1/2}$, has pendant dimethylsiloxane units (D units) of the formula $Me_2SiO_{2/2}$, has a viscosity of 500 Pa·s and has a vinyl group content of 0.015 mol/100 g A2: A straight-chain dimethylpolysiloxane which is capped at both ends with $M^V$ units, has pendant D units, has a viscosity of 100 mPa·s, and has a vinyl group content of 0.04 mol/100 g A3: A branched polysiloxane which is composed of 1 mol % of $M^V$ units and 0.3 mol % of methylsilsesquioxane units (T units) of the formula $MeSiO_{3/2}$, with the balance being D units, has a viscosity of 300 mPa·s and has vinyl group content of 0.013 mol/100 g A4: A branched polysiloxane which is composed of 1.47 mol % of $M^V$ units, 0.49 mol % of T units and 0.24 mol % of $SiO_{4/2}$ units (Q units), with the balance being D units, has a viscosity of 500 mPa·s and has a vinyl group content of 0.02 mol/100 g Component (B)

B1: A methylhydrogenpolysiloxane which is capped at both ends of the molecular chain with trimethylsiloxy units (M units) of the formula $Me_3SiO_{1/2}$, has pendant methylhydrogensiloxane units ($D^H$ units) of the formula $Me(H)SiO_{2/2}$, has a viscosity of 50 mPa·s and has a Si—H group content of 1.1 mol/100 g B2: A methylhydrogenpolysiloxane which is capped at both ends of the molecular chain with M units, has pendant D units and $D^H$ units, has a viscosity of 30 mPa·s and has a Si—H group content of 1.3 mol/100 g B3: A methylhydrogenpolysiloxane which is capped at both ends of the molecular chain with dimethylhydrogensiloxane units ($M^H$ units) of the formula $Me_2(H)SiO_{1/2}$, has pendant D units and $D^H$ units, has a viscosity of 30 mPa·s and has a Si—H group content of 0.9 mol/100 g Component (C)

C1: A liquid catalyst of a platinum-vinyl siloxane complex salt dispersed in a straight-chain dimethylpolysiloxane which is capped at both ends with $M^V$ units, has pendant D units, has a viscosity of 500 mPa·s and has a vinyl group content of 0.015 mol/100 g, the platinum content, in terms of the platinum metal equivalent weight, being 10 wt % (in Tables 1 to 11, the weight of the catalyst included is indicated as the platinum metal equivalent weight)

Component (D)

D1: A polyether-modified silicone of the following formula

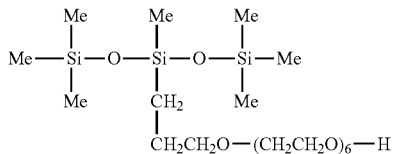

D2: A polyether-modified silicone of the following formula

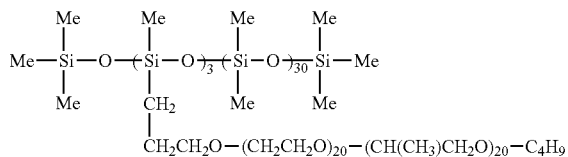

D3: A polyether-modified silicone of the following formula

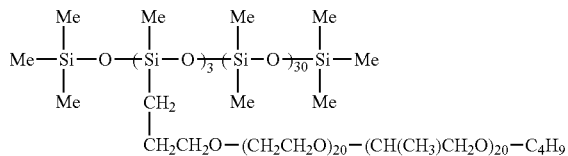

D4: A glycerol-modified silicone of the following formula

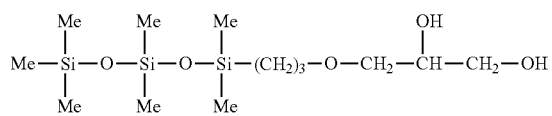

Component (E)

E1: A polysiloxane which is composed of M units and Q units, wherein (M units/Q units) (molar ratio)=0.8 and the content of hydroxyl groups present in the Q units is 0.05 mol/100 g, and which has a viscosity, as a 60 wt % toluene solution, of 10 mPa·s E2: A polysiloxane which is composed of M units, $M^V$ units and Q units, wherein (M units+$M^V$ units)/Q units (molar ratio)=0.8, the vinyl group content is 0.07 mol/100 g and the content of hydroxyl groups present in the Q units is 0.03 mol/100 g, and which has a viscosity, as a 60 wt % toluene solution, of 10 mPa·s Component (F)

F1: 3-Glycidoxypropyltrimethoxysilane

F2: A polysiloxane which is composed of M units, $M^V$ units and T units (M unit+$M^V$ unit)/T unit (molar ratio)=1, wherein the vinyl group content is 0.32 mol/100 g and the content of hydroxyl groups present in the T units is 0.03 mol/100 g, and which has a viscosity of 50 mPa·s Component (G)

G1: A polyoxyethylene alkyl ether surfactant (HLB, 13.6; pH, 5.4)

G2: A polyvinyl alcohol which has a degree of saponification of 90 mol % and which, as a 4 wt % aqueous solution, has a viscosity at 20° C. of 20 mPa·s G3: A polyoxyethylene styrenated phenyl ether surfactant (HLB, 13.0; pH, 7.0)

Component (H)

H1: Ethynylcyclohexanol

<Preparation of Organopolysiloxane Emulsion Compositions>

Preparation of Emulsion Compositions for Mixing 1 to 3 in Examples and Comparative Examples:

Emulsion Compositions for Mixing 1 to 3 that are shown as single columns in Tables 1 to 11 were each prepared as separate emulsion compositions according to the following recipe.

The applicable components from among components (A) to (H), in the amounts (parts by weight) shown in Tables 1 to 11, were placed in a container and mixed together. The weight of component (C) included is indicated in the tables as the platinum metal equivalent weight.

Water was added to the mixture, in the amounts (parts by weight) shown in Tables 1 to 11, and mixing was carried out with a homogenizing mixer, following which a homogenizer was used to render the water-containing mixture into a homogeneous emulsion composition. Each of the resulting emulsion compositions for mixture had a silicone content of 20 wt %.

In the Examples and Comparative Examples, the emulsion compositions for mixing can be roughly categorized by function as follows. However, cases in which a single emulsion composition for mixing possesses a plurality of functions are also included, and so the categories are not limitative as to the actual function. Composition 1 is a base polymer emulsion composition, Composition 2 is a catalyst emulsion composition, and Composition 3 is an additive emulsion composition.

Preparation of Organopolysiloxane Emulsion Compositions for Coating to be Used in Examples and Comparative Examples:

The preparations obtained by mixing together emulsion compositions for mixing in the Composition 1 to 3 combinations shown in Tables 1 to 11 and diluting the mixtures two-fold with water were used as organopolysiloxane emulsion compositions for coating.

<Preparation and Evaluation of Test Specimens>
Appearance and Stability of Emulsion Composition:

The emulsion compositions for mixing and the organopolysiloxane emulsion compositions for coating that had been prepared were each visually examined, and the appearance was rated as "◯," "Δ" (suspended matter is observable), or "x" (separation has occurred). The stability was evaluated by hermetically sealing each emulsion composition for mixing, and rating the appearance after 10 days of standing at 25° C. as "◯" or "x" (separation has occurred).

Viscosity and Average Particle Size of Emulsion Composition:

The viscosities of the prepared emulsion compositions for mixing and organopolysiloxane emulsion compositions for coating were each measured at 25° C. with a Brookfield rotational viscometer. The average particle sizes of the prepared emulsion compositions for mixing and organopolysiloxane emulsion compositions for coating were each measured using an N4 PLUS Submicron Particle Size Analyzer from Beckman Coulter.

The organopolysiloxane emulsion compositions for coating in the Examples and Comparative Examples were evaluated by the following methods.

Wettability on Substrate:

A PET film having a thickness of 38 μm was fixed on a flat, horizontal support, and the prepared organopolysiloxane emulsion composition for coating was applied to the surface using a wiper bar to a silicone solids weight of about 0.2 g/m². Following application, the composition was left to stand at room temperature for 1 minute, and was then visually examined for the occurrence of bumps and crawling. The wettability was rated as "x" when crawling occurred over the entire surface, "Δ" when crawling occurred over part of the surface, "○" when some bumps were observed but no crawling occurred, and "⊙" when no bumps or crawling were observed.

Leveling Ability:

A PET film having a thickness of 38 μm was fixed on a flat, horizontal support, and the prepared organopolysiloxane emulsion composition for coating was applied to the surface using a wiper bar to a silicone solids weight of about 0.2 g/m². Following application, the specimen was immediately placed in a 120° C. dryer and heat-dried for 60 seconds, after which it was left to stand for 1 minute at room temperature and the surface of the cured coat was subsequently visually examined to determine whether phenomena due to surface irregularities, such as bumps, streaks and spot anomalies had occurred.

The leveling ability was rated as "x" when bumps, streaks and spot anomalies occurred over the entire surface, "Δ" when bumps, streaks and spot anomalies occurred over part of the surface; "○" when bumps and streaks were observable to a limited degree, but spot anomalies did not occur; and "⊙" when the surface was smooth and clean.

Transparency of Cured Coat:

A PET film having a thickness of 38 μm was fixed on a flat, horizontal support, and the prepared organopolysiloxane emulsion composition for coating was applied to the surface using a wiper bar to a silicone solids weight of about 0.2 g/m². Following application, the specimen was immediately placed in a 120° C. dryer and heat-dried for 60 seconds, after which it was left to stand for 1 minute at room temperature and cooled to room temperature. The haze value was then measured and used to compare the transparency.

The transparency was rated as "x" when the haze value was 10 or more, "Δ" when it was at least 5 and less than 10, "○" when it was at least 3 and less than 5; and "⊙" when it was less than 3.

Release Force:

A PET film having a thickness of 38 μm was fixed on a flat, horizontal support, and the prepared organopolysiloxane emulsion composition for coating was applied to the surface using a wiper bar to a silicone solids weight of about 0.2 g/m². Following application, the specimen was immediately placed in a 120° C. dryer and heat-dried for 60 seconds to form a cured coat, which was used as a silicone separator. After storing this at 25° C. for 20 hours, Tesa-7475 tape was laminated thereon in accordance with the FINAT method, thereby preparing a test specimen for evaluation.

Using a tensile testing machine, the Tesa-7475 tape on this test specimen was peeled off at an angle of 180° and a peel rate of 0.3 m/min, and the force required for peeling was measured as the release force (N/25 mm).

Pot Life:

The prepared organopolysiloxane emulsion composition for coating was left to stand for 12 hours at 25° C., following which the wettability, leveling ability and transparency were evaluated in the same way as described above.

TABLE 1

Example 1 to 3 formulations

| Ingredients (pbw) | Example 1 | | | Example 2 | | | Example 3 | | |
|---|---|---|---|---|---|---|---|---|---|
| | Composition 1 | Composition 2 | Total (coating composition) | Composition 1 | Composition 2 | Total (coating composition) | Composition 1 | Composition 2 | Total (coating composition) |
| A1 | 95 | 5 | 100 | 95 | 5 | 100 | 95 | 5 | 100 |
| A2 | | | | | | | | | |
| A3 | | | | | | | | | |
| A4 | | | | | | | | | |
| B1 | 2.73 | | 2.73 | 2.73 | | 2.73 | 2.73 | | 2.73 |
| B2 | | | | | | | | | |
| B3 | | | | | | | | | |
| C1 | | 0.01 | 0.01 | | 0.01 | 0.01 | | 0.01 | 0.01 |
| D1 | 1 | | 1 | | | 0.01 | | | 10 |
| D2 | | | | 0.01 | | | | | |
| D3 | | | | | | | 10 | | |
| D4 | | | | | | | | | |
| E1 | | 0 | | | 0 | | | 0 | |
| E2 | | | | | | | | | |
| F1 | | 0 | | | 0 | | | 0 | |
| F2 | | | | | | | | | |

TABLE 1-continued

Example 1 to 3 formulations

| Ingredients (pbw) | Example 1 Composition 1 | Example 1 Composition 2 | Example 1 Total (coating composition) | Example 2 Composition 1 | Example 2 Composition 2 | Example 2 Total (coating composition) | Example 3 Composition 1 | Example 3 Composition 2 | Example 3 Total (coating composition) |
|---|---|---|---|---|---|---|---|---|---|
| G1 | 1 97 | 0.10 | 5.18 | 1.99 | 0.10 | 5.23 | 2.15 | 0 10 | 5.63 |
| G2 | 2.96 | 0.15 | | 2.99 | 0.15 | | 3.23 | 0.15 | |
| G3 | | | | | | | | | |
| H1 | 1.04 | | 1.04 | 1.03 | | 1.03 | 1.13 | | 1.13 |
| Water | 388.9 | 19.8 | (408.7) | 385.0 | 19.8 | (404.8) | 424.4 | 19.8 | (444.2) |
| Sx components [1] | 98.7 | 5.0 | 103.7 | 97.7 | 5.0 | 102.7 | 107.7 | 5.0 | 112.7 |
| Molar ratio 1 [2] | 2.1 | 0 | 2.0 | 2.1 | 0 | 2.0 | 2.1 | 0 | 2.0 |
| Molar ratio 2 [3] | 2.1 | 0 | 2.0 | 2.1 | 0 | 2.0 | 2.1 | 0 | 2.0 |
| Evaluation Results | | | | | | | | | |
| Appearance | ○ | ○ | ○ | ○ | ○ | ○ | ○ | ○ | ○ |
| Stability | ○ | ○ | | ○ | ○ | | ○ | ○ | |
| Viscosity (mPa·s) | 70 | 60 | 70 | 60 | 60 | 60 | 80 | 60 | 80 |
| Average particle size (nm) | 500 | 700 | 500 | 800 | 700 | 800 | 400 | 700 | 400 |
| Wettability | | Initial | ○ | | Initial | ○ | | Initial | ○ |
| | | Over time | Δ | | Over time | Δ | | Over time | ○ |
| Leveling ability | | Initial | ○ | | Initial | ○ | | Initial | ○ |
| | | Over time | Δ | | Over time | Δ | | Over time | ○ |
| Transparency | | Initial | ○ | | Initial | Δ | | Initial | ○ |
| | | Over time | Δ | | Over time | x | | Over time | Δ |
| Release force | | | 0.25 | | | 0.30 | | | 0.23 |

[1] "Sx components" refers to the silicone components among components (A) to (F).
[2] Ratio of number of moles of Si—H groups in component (B) to number of moles of vinyl groups in component (A).
[3] Ratio of total number of moles of Si—H groups in composition to total number of moles of vinyl groups in composition.

TABLE 2

Comparative Example 1 to 3 formulations

| Ingredients (pbw) | Comp. Ex. 1 Composition 1 | Comp. Ex. 1 Composition 2 | Comp. Ex. 1 Total (coating composition) | Comp. Ex. 2 Composition 1 | Comp. Ex. 2 Composition 2 | Comp. Ex. 2 Total (coating composition) | Comp. Ex. 3 Composition 1 | Comp. Ex. 3 Composition 2 | Comp. Ex. 3 Total (coating composition) |
|---|---|---|---|---|---|---|---|---|---|
| A1 | 95 | 5 | 100 | 95 | 5 | 100 | 90 | 10 | 100 |
| A2 | | | | | | | | | |
| A3 | | | | | | | | | |
| A4 | | | | | | | | | |
| B1 | 2.73 | | 2.73 | 2.73 | | 2.73 | 2.73 | | 2.73 |
| B2 | | | | | | | | | |
| B3 | | | | | | | | | |
| C1 | | 0.01 | 0.01 | | 0.01 | 0.01 | | 0.01 | 0.01 |
| D1 | | | 0 | 15 | | 15 | | | 0 |
| D2 | | | | | | | | | |
| D3 | | | | | | | | | |
| D4 | | | | | | | | | |
| E1 | | | 0 | | | 0 | | | 0 |
| E2 | | | | | | | | | |
| F1 | | | 0 | | | 0 | | | 0 |
| F2 | | | | | | | | | |
| G1 | 1.95 | 0.10 | 5.13 | 2.25 | 0.10 | 5.88 | 1.85 | 0.20 | 5.13 |
| G2 | 2.93 | 0.15 | | 3.38 | 0.15 | | 2.78 | 0.30 | |
| G3 | | | | | | | | | |
| H | 0.51 | | 0.51 | 0.61 | | 0.61 | 0.49 | | 0.49 |
| Water | 385.5 | 19.8 | (405.3) | 444.7 | 19.8 | (464.5) | 365.8 | 39.5 | (405.3) |
| Sx components [1] | 97.7 | 5.0 | 102.7 | 112.7 | 5.0 | 117.7 | 92.7 | 10.0 | 102.7 |
| Molar ratio 1 [2] | 2.1 | 0 | 2.0 | 2.1 | 0 | 2.0 | 2.1 | 0 | 2.0 |
| Molar ratio 2 [3] | 2.1 | 0 | 2.0 | 2.1 | 0 | 2.0 | 2.1 | 0 | 2.0 |
| Evaluation Results | | | | | | | | | |
| Appearance | ○ | ○ | ○ | ○ | ○ | ○ | ○ | ○ | ○ |
| Stability | ○ | ○ | | ○ | ○ | | ○ | ○ | |
| Viscosity (mPa·s) | 60 | 60 | 60 | 90 | 60 | 90 | 60 | 40 | 60 |
| Average particle size (nm) | 800 | 700 | 800 | 400 | 700 | 400 | 800 | 1,500 | 800 |

TABLE 2-continued

Comparative Example 1 to 3 formulations

| | Comparative Example 1 | | | Comparative Example 2 | | | Comparative Example 3 | | |
| --- | --- | --- | --- | --- | --- | --- | --- | --- | --- |
| Ingredients (pbw) | Composition 1 | Composition 2 | Total (coating composition) | Composition 1 | Composition 2 | Total (coating composition) | Composition 1 | Composition 2 | Total (coating composition) |
| Wettability | Initial | Δ | | Initial | ○ | | Initial | Δ | |
| | Over time | x | | Over time | ○ | | Over time | x | |
| Leveling ability | Initial | Δ | | Initial | ○ | | Initial | Δ | |
| | Over time | x | | Over time | Δ | | Over time | x | |
| Transparency | Initial | Δ | | Initial | Δ | | Initial | x | |
| | Over time | x | | Over time | x | | Over time | x | |
| Release force | | 0.30 | | | 0.35 | | | 0.35 | |

TABLE 3

Example 4 and 5 formulations

| | Example 4 | | | | Example 5 | | | |
| --- | --- | --- | --- | --- | --- | --- | --- | --- |
| Ingredients (pbw) | Composition 1 | Composition 2 | Composition 3 | Total (coating composition) | Composition 1 | Composition 2 | Composition 3 | Total (coating composition) |
| A1 | | 5 | | 100 | | 5 | | 100 |
| A2 | | | 10 | | | | 10 | |
| A3 | 85 | | | | 85 | | | |
| A4 | | | | | | | | |
| B1 | | | | 2.74 | | | | 2.74 |
| B2 | 1.85 | | | | 1.85 | | | |
| B3 | | | 0.89 | | | | 0.89 | |
| C1 | | 0.01 | | 0.01 | | 0.01 | | 0.01 |
| D1 | | | 1 | 1 | | | 1 | 1 |
| D2 | | | | | | | | |
| D3 | | | | | | | | |
| D4 | | | | | | | | |
| E1 | | | 0.1 | 0.1 | | | 1 | 1 |
| E2 | | | | | | | | |
| F1 | | | | 0 | | | | 0 |
| F2 | | | | | | | | |
| G1 | 1.74 | 0.10 | 0.24 | | 1.74 | 0.10 | 0.26 | |
| G2 | 2.61 | 0.15 | 0.36 | 5.20 | 2.61 | 0.15 | 0.39 | 5.25 |
| G3 | | | | | | | | |
| H | 0.92 | | 0.12 | 1.04 | 0.92 | | 0.13 | 1.05 |
| Water | 342.2 | 19.8 | 47.2 | (409.2) | 342.2 | 19.8 | 50.8 | (412.8) |
| Sx components [1] | 86.9 | 5.0 | 12.0 | 103.9 | 86.9 | 5.0 | 12.9 | 104.8 |
| Molar ratio 1 [2] | 2.2 | 0 | 2.0 | 2.0 | 2.2 | 0 | 2.0 | 2.0 |
| Molar ratio 2 [3] | 2.2 | 0 | 2.0 | 2.0 | 2.2 | 0 | 2.0 | 2.0 |
| Evaluation Results | | | | | | | | |
| Appearance | ○ | ○ | ○ | ○ | ○ | ○ | ○ | ○ |
| Stability | ○ | ○ | ○ | | ○ | ○ | ○ | |
| Viscosity (mPa·s) | 70 | 60 | 60 | 70 | 70 | 60 | 60 | 70 |
| Average particle size (nm) | 600 | 700 | 700 | 600 | 600 | 700 | 800 | 600 |
| Wettability | | | Initial | ○ | | | Initial | ○ |
| | | | Over time | Δ | | | Over time | ○ |
| Leveling ability | | | Initial | ○ | | | Initial | ○ |
| | | | Over time | ○ | | | Over time | ○ |
| Transparency | | | Initial | ○ | | | Initial | ⊚ |
| | | | Overtime | Δ | | | Over time | Δ |
| Release force | | | | 0.25 | | | | 0.20 |

TABLE 4

Example 6 formulation

| Ingredients (pbw) | Example 6 | | | |
|---|---|---|---|---|
| | Composition 1 | Composition 2 | Composition 3 | Total (coating composition) |
| A1 | | 5 | | 100 |
| A2 | | | 20 | |
| A3 | 75 | | | |
| A4 | | | | |
| B1 | | | | 4.98 |
| B2 | 1.65 | | | |
| B3 | | | 3.33 | |
| C1 | | 0.01 | | 0.01 |
| D1 | | | 1 | 1 |
| D2 | | | | |
| D3 | | | | |
| D4 | | | | |
| E1 | | | | 10 |
| E2 | | | 10 | |
| F1 | | | | 0 |
| F2 | | | | |
| G1 | 1.53 | 0.10 | 0.69 | 5.80 |
| G2 | 2.30 | 0.15 | 1.03 | |
| G3 | | | | |
| H | 0.82 | | 0.34 | 1.16 |
| Water | 302.0 | 19.8 | 135.3 | (457.1) |
| Sx components[1] | 76.7 | 5.0 | 34.3 | 116.0 |
| Molar ratio 1[2] | 2.1 | 0 | 7.5 | 2.8 |
| Molar ratio 2[3] | 2.1 | 0 | 2.0 | 2.0 |
| Evaluation Results | | | | |
| Appearance | ○ | ○ | ○ | ○ |
| Stability | ○ | ○ | ○ | |
| Viscosity (mPa · s) | 70 | 60 | 50 | 60 |
| Average particle size (mm) | 600 | 700 | 900 | 800 |
| Wettability Initial | | | | ○ |
| Over time | | | | ○ |
| Leveling ability Initial | | | | ○ |
| Over time | | | | ○ |
| Transparency Initial | | | | ◉ |
| Over time | | | | Δ |
| Release force | | | | 0.40 |

TABLE 5

Example 7 to 9 formulations

| Ingredients (pbw) | Example 7 | | | Example 8 | | | Example 9 | | |
|---|---|---|---|---|---|---|---|---|---|
| | Composition 1 | Composition 2 | Total (coating composition) | Composition 1 | Composition 2 | Total (coating composition) | Composition 1 | Composition 2 | Total (coating composition) |
| A1 | 99 | 1 | 100 | 98 | 2 | 100 | 97 | 3 | 100 |
| A2 | | | | | | | | | |
| A3 | | | | | | | | | |
| A4 | | | | | | | | | |
| B1 | 2.73 | | 2.73 | 2.73 | | 2.73 | 2.73 | | 2.73 |
| B2 | | | | | | | | | |
| B3 | | | | | | | | | |
| C1 | | 0.01 | 0.01 | | 0.01 | 0.01 | | 0.01 | 0.01 |
| D1 | 1 | | 1 | 1 | | 1 | 1 | | 1 |
| D2 | | | | | | | | | |
| D3 | | | | | | | | | |
| D4 | | | | | | | | | |
| E1 | | | 0 | | | 0 | | | 0 |
| E2 | | | | | | | | | |
| F1 | | | 0 | | | 0 | | | 0 |
| F2 | | | | | | | | | |
| G1 | 2 05 | 0.02 | 5.18 | 2.03 | 0.04 | 5.18 | 2.01 | 0 06 | 5.18 |
| G2 | 3.08 | 0.03 | | 3.05 | 0.06 | | 3.02 | 0.09 | |
| G3 | | | | | | | | | |
| H | 1.04 | | 1.04 | 1.04 | | 1.04 | 1.04 | | 1.04 |
| Water | 404.7 | 40 | (408.7) | 400.8 | 7.9 | (408.7) | 396.8 | 11.9 | (408.7) |

TABLE 5-continued

Example 7 to 9 formulations

| Ingredients (pbw) | Example 7 Composition 1 | Example 7 Composition 2 | Example 7 Total (coating composition) | Example 8 Composition 1 | Example 8 Composition 2 | Example 8 Total (coating composition) | Example 9 Composition 1 | Example 9 Composition 2 | Example 9 Total (coating composition) |
|---|---|---|---|---|---|---|---|---|---|
| Sx components [1] | 102.7 | 1.0 | 103.7 | 101.7 | 2.0 | 103.7 | 100.7 | 3.0 | 103.7 |
| Molar ratio 1 [2] | 2.0 | 0 | 2.0 | 2.0 | 0 | 2.0 | 2.1 | 0 | 2.0 |
| Molar ratio 2 [3] | 2.0 | 0 | 2.0 | 2.0 | 0 | 2.0 | 2.1 | 0. | 2.0 |
| Evaluation Results | | | | | | | | | |
| Appearance | ○ | ○ | ○ | ○ | ○ | ○ | ○ | ○ | ○ |
| Stability | ○ | ○ | | ○ | ○ | | ○ | ○ | |
| Viscosity (mPa·s) | 70 | 50 | 70 | 70 | 60 | 70 | 70 | 60 | 70 |
| Average particle size (nm) | 500 | 900 | 500 | 500 | 800 | 500 | 500 | 900 | 500 |
| Wettability | | Initial | ○ | | Initial | ○ | | Initial | ○ |
| | | Over time | ○ | | Over time | ○ | | Over time | ○ |
| Leveling ability | | Initial | ○ | | Initial | ○ | | Initial | ○ |
| | | Over time | ○ | | Over time | ○ | | Over time | ○ |
| Transparency | | Initial | ○ | | Initial | ○ | | Initial | ○ |
| | | Over time | ○ | | Over time | ○ | | Over time | ○ |
| Release force | | | 0.22 | | | 0.22 | | | 0.25 |

TABLE 6

Example 10 to 12 formulations

| Ingredients (pbw) | Example 10 Composition 1 | Example 10 Composition 2 | Example 10 Total (coating composition) | Example 11 Composition 1 | Example 11 Composition 2 | Example 11 Total (coating composition) | Example 12 Composition 1 | Example 12 Composition 2 | Example 12 Total (coating composition) |
|---|---|---|---|---|---|---|---|---|---|
| A1 | 99 | 1 | 100 | 99 | 1 | 100 | 97 | 3 | 100 |
| A2 | | | | | | | | | |
| A3 | | | | | | | | | |
| A4 | | | | | | | | | |
| B1 | 2.73 | | 2.73 | 2.73 | | 2.73 | 2.73 | | 2.73 |
| B2 | | | | | | | | | |
| B3 | | | | | | | | | |
| C1 | | 0.01 | 0.01 | | 0.01 | 0.01 | | 0.01 | 0.01 |
| D1 | | 0.01 | 0.01 | | 10 | | | | 0.01 |
| D2 | 0.01 | | | | | | 0.01 | | |
| D3 | | | | 10 | | | | | |
| D4 | | | | | | | | | |
| E1 | | 0 | | | 0 | | | 0 | |
| E2 | | | | | | | | | |
| F1 | | 0 | | | 0 | | | 0 | |
| F2 | | | | | | | | | |
| G1 | 2 03 | 0.02 | 5.13 | 2.23 | 0.02 | 5.63 | 1.99 | 0 06 | 5.13 |
| G2 | 3.05 | 0.03 | | 3.35 | 0.03 | | 2.99 | 0.09 | |
| G3 | | | | | | | | | |
| H1 | 0.51 | | 0.51 | 0.56 | | 0.56 | 0.51 | | 0.51 |
| Water | 401.3 | 40 | (405.3) | 440.8 | 4.0 | (444.8) | 393.4 | 11.9 | (405.3) |
| Sx components [1] | 101.7 | 1.0 | 102.7 | 111.7 | 1.0 | 112.7 | 99.7 | 3.0 | 102.7 |
| Molar ratio 1 [2] | 2.1 | 0 | 2.0 | 2.1 | 0 | 2.0 | 2.1 | 0 | 2.0 |
| Molar ratio 2 [3] | 2.1 | 0 | 2.0 | 2.1 | 0 | 2.0 | 2.1 | 0 | 2.0 |
| Evaluation Results | | | | | | | | | |
| Appearance | ○ | ○ | ○ | ○ | ○ | ○ | ○ | ○ | ○ |
| Stability | ○ | ○ | | ○ | ○ | | ○ | ○ | |
| Viscosity (mPa·s) | 60 | 50 | 60 | 80 | 50 | 80 | 60 | 60 | 60 |
| Average particle size (nm) | 800 | 900 | 800 | 400 | 900 | 400 | 800 | 900 | 800 |
| Wettability | | Initial | ○ | | Initial | ○ | | Initial | ○ |
| | | Over time | Δ | | Over time | ○ | | Over time | ○ |
| Leveling ability | | Initial | ○ | | Initial | ○ | | Initial | ○ |
| | | Over time | ○ | | Over time | ○ | | Over time | ○ |
| Transparency | | Initial | ○ | | Initial | ○ | | Initial | ○ |
| | | Over time | ○ | | Over time | ○ | | Over time | ○ |
| Release force | | | 0.28 | | | 0.25 | | | 0.25 |

TABLE 7

Example 13 formulation

| Ingredients (pbw) | Composition 1 | Composition 2 | Total (coating composition) |
|---|---|---|---|
| A1 | 97 | 3 | 100 |
| A2 | | | |
| A3 | | | |
| A4 | | | |
| B1 | 2.73 | | 2.73 |
| B2 | | | |
| B3 | | | |
| C1 | | 0.01 | 0.01 |
| D1 | | | 10 |
| D2 | | | |
| D3 | 10 | | |
| D4 | | | |
| E1 | | | 0 |
| E2 | | | |
| F1 | | | 0 |
| F2 | | | |
| G1 | 2.19 | 0.06 | 5.63 |
| G2 | 3.29 | 0.09 | |
| G3 | | | |
| H1 | | 0.56 | 0.56 |
| Water | 432.9 | 11.9 | (444.8) |
| Sx components[1)] | 109.7 | 3.0 | 112.7 |
| Molar ratio 1[2)] | 2.1 | 0 | 2.0 |
| Molar ratio 2[3)] | 2.1 | 0 | 2.0 |

Evaluation Results

| | Composition 1 | Composition 2 | Total (coating composition) |
|---|---|---|---|
| Appearance | ○ | ○ | ○ |
| Stability | ○ | ○ | |
| Viscosity (mPa·s) | 80 | 60 | 80 |
| Average particle size (nm) | 400 | 900 | 400 |
| Wettability Initial | | | ○ |
| Over time | | | ○ |
| Leveling ability Initial | | | ○ |
| Over time | | | ○ |
| Transparency Initial | | | ○ |
| Over time | | | ○ |
| Release force | | | 0.25 |

TABLE 8

Example 14 and 15 formulations

| | Example 14 | | | | Example 15 | | | |
|---|---|---|---|---|---|---|---|---|
| | Composition 1 | Composition 2 | Composition 3 | Total (coating composition) | Composition 1 | Composition 2 | Composition 3 | Total (coating composition) |
| A1 | | 1 | | 100 | | 1 | | 100 |
| A2 | | | 10 | | | | 10 | |
| A3 | 89 | | | | 89 | | | |
| A4 | | | | | | | | |
| B1 | | | | 2.73 | | | | 2.73 |
| B2 | 1.84 | | | | 1.84 | | | |
| B3 | | | 0.89 | | | | 0.89 | |
| C1 | | 0.01 | | 0.01 | | 0.01 | | 0.01 |
| D1 | | | 1 | 1 | | | 1 | 1 |
| D2 | | | | | | | | |
| D3 | | | | | | | | |
| D4 | | | | | | | | |
| E1 | | | 0.1 | 0.1 | | | 1 | 1 |
| E2 | | | | | | | | |
| F1 | | | | 0 | | | | 0 |
| F2 | | | | | | | | |
| G1 | 1.82 | 0.02 | 0.24 | | 1.82 | 0.02 | 0.26 | |
| G2 | 2.73 | 0.03 | 0.36 | 5.20 | 2.73 | 0.03 | 0.39 | 5.25 |
| G3 | | | | | | | | |
| H | 0.46 | | 0.06 | 0.52 | 0.48 | | 0.06 | 0.54 |
| Water | 358.4 | 4.0 | 47.3 | (409.7) | 358.4 | 4.0 | 50.8 | (413.2) |
| Sx components [1)] | 90.8 | 1.0 | 12.0 | 103.8 | 90.8 | 1.0 | 12.9 | 104.7 |
| Molar ratio 1 [2)] | 2.0 | 0 | 2.0 | 2.0 | 2.0 | 0 | 2.0 | 2.0 |
| Molar ratio 2 [3)] | 2.0 | 0 | 2.0 | 2.0 | 2.0 | 0 | 2.0 | 2.0 |

Evaluation Results

| | Comp 1 | Comp 2 | Comp 3 | Total | Comp 1 | Comp 2 | Comp 3 | Total |
|---|---|---|---|---|---|---|---|---|
| Appearance | ○ | ○ | ○ | ○ | ○ | ○ | ○ | ○ |
| Stability | ○ | ○ | ○ | | ○ | ○ | ○ | |
| Viscosity (mPa·s) | 70 | 50 | 70 | 70 | 70 | 50 | 60 | 70 |
| Average particle size (nm) | 600 | 900 | 600 | 500 | 600 | 900 | 800 | 600 |
| Wettability Initial | | | | ○ | | | | ○ |
| Over time | | | | ○ | | | | ○ |
| Leveling ability Initial | | | | ○ | | | | ○ |
| Over time | | | | ○ | | | | ○ |
| Transparency Initial | | | | ○ | | | | ⊚ |
| Over time | | | | ○ | | | | ⊚ |
| Release force | | | | 0.23 | | | | 0.20 |

TABLE 9

Example 16 and 17 formulations

| | Example 16 | | | | Example 17 | | | |
|---|---|---|---|---|---|---|---|---|
| | Composition 1 | Composition 2 | Composition 3 | Total (coating composition) | Composition 1 | Composition 2 | Composition 3 | Total (coating composition) |
| A1 | | 1 | | 100 | | 3 | | 100 |
| A2 | | | 20 | | | | 10 | |
| A3 | 79 | | | | 87 | | | |
| A4 | | | | | | | | |
| B1 | | | | 4.97 | | | | 2.74 |
| B2 | 1.64 | | | | 1.85 | | | |
| B3 | | | 3.33 | | | | 0.89 | |
| C1 | | 0.01 | | 0.01 | | 0.01 | | 0.01 |
| D1 | | | 1 | 1 | | | 1 | 1 |
| D2 | | | | | | | | |
| D3 | | | | | | | | |
| D4 | | | | | | | | |
| E1 | | | | 10 | | | 0.1 | 0.1 |
| E2 | | | 10 | | | | | |
| F1 | | | | 0 | | | | 0 |
| F2 | | | | | | | | |
| G1 | 1.61 | 0.02 | 0.69 | 5.80 | 1.78 | 0.06 | 0.24 | 5.20 |
| G2 | 2.42 | 0.03 | 1.03 | | 2.67 | 0.09 | 0.36 | |
| G3 | | | | | | | | |
| H | 0.43 | | 0.17 | 0.60 | 0.46 | | 0.06 | 0.52 |
| Water | 318.1 | 4.0 | 135.4 | (457.5) | 350.5 | 11.9 | 47.3 | (409.7) |
| Sx components [1] | 80.6 | 1.0 | 34.3 | 115.9 | 88.8 | 3.0 | 12.0 | 103.8 |
| Molar ratio 1 [2] | 2.0 | 0 | 7.5 | 2.8 | 2.1 | 0 | 2.0 | 2.0 |
| Molar ratio 2 [3] | 2.0 | 0 | 2.0 | 2.0 | 2.1 | 0 | 2.0 | 2.0 |
| Evaluation Results | | | | | | | | |
| Appearance | ○ | ○ | ○ | ○ | ○ | ○ | ○ | ○ |
| Stability | ○ | ○ | ○ | | ○ | ○ | ○ | |
| Viscosity (mPa·s) | 70 | 50 | 50 | 60 | 70 | 60 | 60 | 70 |
| Average particle size (nm) | 600 | 900 | 900 | 800 | 600 | 900 | 900 | 600 |
| Wettability Initial | | | | ○ | | | | ○ |
| Wettability Over time | | | | ○ | | | | ○ |
| Leveling ability Initial | | | | ○ | | | | ○ |
| Leveling ability Over time | | | | ○ | | | | ○ |
| Transparency Initial | | | | ⊚ | | | | ○ |
| Transparency Over time | | | | ⊚ | | | | ○ |
| Release force | | | | 0.37 | | | | 0.23 |

TABLE 10

Example 18 and 19 formulations

| | Example 18 | | | | Example 19 | | | |
|---|---|---|---|---|---|---|---|---|
| | Composition 1 | Composition 2 | Composition 3 | Total (coating composition) | Composition 1 | Composition 2 | Composition 3 | Total (coating composition) |
| A1 | | 3 | | 100 | | 3 | | 100 |
| A2 | | | 10 | | | | 20 | |
| A3 | 87 | | | | 77 | | | |
| A4 | | | | | | | | |
| B1 | | | | 2.74 | | | | 4.97 |
| B2 | 1.85 | | | | 1.64 | | | |
| B3 | | | 0.89 | | | | 3.33 | |
| C1 | | 0.01 | | 0.01 | | 0.01 | | 0.01 |
| D1 | | | 1 | 1 | | | 1 | 1 |
| D2 | | | | | | | | |
| D3 | | | | | | | | |
| D4 | | | | | | | | |
| E1 | | | 1 | 1 | | | | 10 |
| E2 | | | | | | | 10 | |
| F1 | | | | 0 | | | | 0 |
| F2 | | | | | | | | |
| G1 | 1.78 | 0.06 | 0.26 | | 1.57 | 0.06 | 0.69 | |
| G2 | 2.67 | 0.09 | 0.39 | 5.25 | 2.36 | 0.09 | 1.03 | 5.80 |
| G3 | | | | | | | | |

TABLE 10-continued

Example 18 and 19 formulations

| | Example 18 | | | | Example 19 | | | |
|---|---|---|---|---|---|---|---|---|
| | Composition 1 | Composition 2 | Composition 3 | Total (coating composition) | Composition 1 | Composition 2 | Composition 3 | Total (coating composition) |
| H | 0.47 | | 0.06 | 0.53 | 0.42 | | 0.17 | 0.59 |
| Water | 350.5 | 11.9 | 50.8 | (413.2) | 310.2 | 11.9 | 133.4 | (457.5) |
| Sx components [1] | 88.8 | 3.0 | 12.9 | 104.7 | 78.6 | 3.0 | 34.3 | 115.9 |
| Molar ratio 1 [2] | 2.1 | 0 | 2.0 | 2.0 | 2.1 | 0 | 7.5 | 2.8 |
| Molar ratio 2 [3] | 2.1 | 0 | 2.0 | 2.0 | 2.1 | 0 | 2.0 | 2.0 |
| Evaluation Results | | | | | | | | |
| Appearance | ○ | ○ | ○ | ○ | ○ | ○ | ○ | ○ |
| Stability | ○ | ○ | ○ | | ○ | ○ | ○ | |
| Viscosity (mPa·s) | 70 | 60 | 60 | 70 | 70 | 60 | 50 | 70 |
| Average particle size (nm) | 600 | 900 | 800 | 600 | 600 | 900 | 900 | 600 |
| Wettability | | | Initial | ○ | | | Initial | ○ |
| | | | Over time | ○ | | | Over time | ○ |
| Leveling ability | | | Initial | ○ | | | Initial | ○ |
| | | | Over time | ○ | | | Over time | ○ |
| Transparency | | | Initial | ⊚ | | | Initial | ⊚ |
| | | | Over time | ⊚ | | | Over time | ⊚ |
| Release force | | | | 0.23 | | | | 0.40 |

TABLE 11

Example 20 to 22 formulations

| | Example 20 | | | Example 21 | | | Example 22 | | |
|---|---|---|---|---|---|---|---|---|---|
| Ingredients (pbw) | Composition 1 | Composition 2 | Total (coating composition) | Composition 1 | Composition 2 | Total (coating composition) | Composition 1 | Composition 2 | Total (coating composition) |
| A1 | | 2 | 100 | | 2 | 100 | | 2 | 100 |
| A2 | | | | | | | 49 | | |
| A3 | | | | | | | | | |
| A4 | 98 | | | 98 | | | 49 | | |
| B1 | 3.87 | | 3.87 | | 5.75 | 5.75 | | 7.25 | 7.25 |
| B2 | | | | 5.75 | | | 7.25 | | |
| B3 | | | | | | | | | |
| C1 | | 0.01 | 0.01 | | 0.01 | 0.01 | | 0.01 | 0.01 |
| D1 | | 2 | 2 | | 2 | 2 | | 2 | 2 |
| D2 | | | | | | | | | |
| D3 | | | | | | | | | |
| D4 | 2 | | | 2 | | | 2 | | |
| E1 | 2 | | 2 | | | | 2 | | 2 |
| E2 | | | | 2 | | 2 | | | |
| F1 | 2 | | 2 | | | | | | |
| F2 | | | | 10 | | 10 | 10 | | 10 |
| G1 | | 5.50 | | | 5.98 | | | 4.01 | |
| G2 | 3.24 | 0.06 | 3.53 | 0.06 | | 2.39 | 0.04 | | |
| G3 | 2.16 | 0.04 | 2.35 | 0.04 | | 1.55 | 0.03 | | |
| H | 0.55 | | 0.55 | 0.60 | | 0.60 | 0.61 | | 0.61 |
| Water | 425.5 | 7.9 | (433.4) | 464.5 | 7.9 | (472.4) | 472.5 | 8.0 | (480.5) |
| Sx components [1] | 107.9 | 2.0 | 109.9 | 117.7 | 2.0 | 119.7 | 119.3 | 2.0 | 121.3 |
| Molar ratio 1 [2] | 2.2 | 0 | 2.1 | 3.8 | 0 | 3.8 | 3.2 | 0 | 3.1 |
| Molar ratio 2 [3] | 2.2 | 0 | 2.1 | 1.4 | 0 | 1.4 | 1.5 | 0 | 1.5 |
| Evaluation Results | | | | | | | | | |
| Appearance | ○ | ○ | ○ | ○ | ○ | ○ | ○ | ○ | ○ |
| Stability | ○ | ○ | | ○ | ○ | | ○ | ○ | |
| Viscosity (mPa·s) | 70 | 60 | 70 | 60 | 60 | 60 | 40 | 50 | 40 |
| Average particle size (nm) | 500 | 800 | 500 | 800 | 800 | 800 | 1,700 | 1,300 | 400 |
| Wettability | | Initial | ⊚ | | Initial | ⊚ | | Initial | ○ |
| | | Over time | ○ | | Over time | ○ | | Over time | ○ |
| Leveling ability | | Initial | ○ | | Initial | ⊚ | | Initial | ⊚ |
| | | Over time | ○ | | Over time | ○ | | Over time | ○ |

TABLE 11-continued

Example 20 to 22 formulations

| Ingredients (pbw) | Example 20 | | | Example 21 | | | Example 22 | | |
|---|---|---|---|---|---|---|---|---|---|
| | Composition 1 | Composition 2 | Total (coating composition) | Composition 1 | Composition 2 | Total (coating composition) | Composition 1 | Composition 2 | Total (coating composition) |
| Transparency | | Initial | ⊚ | | Initial | ⊚ | | Initial | ⊚ |
| | | Over time | ⊚ | | Over time | ⊚ | | Over time | ⊚ |
| Release force | | | 0.24 | | | 0.40 | | | 0.35 |

The invention claimed is:

1. An organopolysiloxane emulsion composition for release paper or release film that is obtained by dispersing in water a mixture comprising following components (A) to (D) and (G):
   (A) 100 parts by weight of an alkenyl group-containing diorganopolysiloxane having at least two alkenyl groups per molecule and having a viscosity at 25° C. of not more than 1,000 Pa·s;
   (B) an organohydrogenpolysiloxane having at least two Si—H groups per molecule and having a viscosity at 25° C. of not more than 1 Pa·s, in an amount corresponding to a number of moles of Si—H groups that is from 0.5 to 10 times the number of moles of alkenyl groups in component (A);
   (C) from 0.01 to 3 parts by weight of a curing catalyst; and
   (D) from 0.01 to 10 parts by weight of a polyol-modified organosilicon compound of formula (8) below

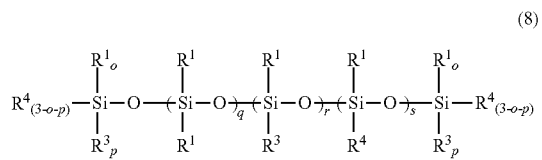

(8)

wherein each $R^1$ is independently a substituted or unsubstituted monovalent hydrocarbon group of 1 to 20 carbon atoms without an aliphatic unsaturated bond; each $R^3$ is independently a hydrogen atom, a hydroxyl group, an alkoxy group of 1 to 4 carbon atoms, or a substituted or unsubstituted alkenyl group of 2 to 20 carbon atoms; each $R^4$ is independently a group having the following formulas:

—(CH$_2$)$_{aa}$—O—(CH$_2$—CH(OH)—CH$_2$O)$_{da}$—R$^6$ wherein $R^6$ is a substituted or unsubstituted monovalent hydrocarbon group of 1 to 10 carbon atoms without an aliphatic unsaturated bond, or a hydrogen atom; aa is an integer from 1 to 10; and da is an integer from 1 to 20; q, r, and s, are integers of 0 or more; q+r+s is integers from 0 to 98; each o is independently an integer from 0 to 3; p is an integer from 0 to 3; o +each p is independently an integer from 0 to 3; when o+p is 3 for each terminal group, s is 1 or more; and
   (G) an emulsifying agent excluding component (D).

2. The organopolysiloxane emulsion composition for release paper or release film of claim 1, wherein the mixture further comprises (E) from 0.1 to 10 parts by weight, per 100 parts by weight of component (A), of an organopolysiloxane resin composed primarily of M units of formula (1) below and Q units of formula (2) below in a molar ratio of M units to Q units (M/Q) in the range of 1/9 to 9/1:

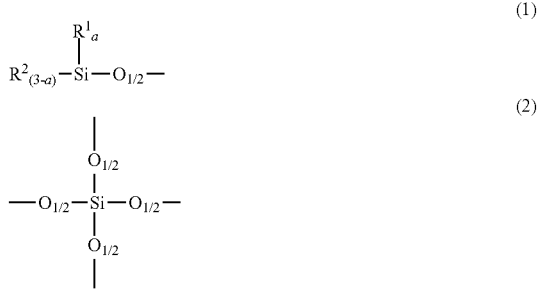

(1)

(2)

wherein each $R^1$ is independently a substituted or unsubstituted monovalent hydrocarbon group of 1 to 20 carbon atoms without an aliphatic unsaturated bond; each $R^2$ is independently a substituted or unsubstituted alkenyl group of 2 to 20 carbon atoms; the letter a is an integer from 0 to 3; and $O_{1/2}$— indicates that another unit is bonded through $O_{1/2}$—.

3. The organopolysiloxane emulsion composition for release paper or release film of claim 1, wherein the mixture further comprises (F) from 0.1 to 50 parts by weight of an adhesion promoter per 100 parts by weight of component (A).

4. The organopolysiloxane emulsion composition for release paper or release film of claim 3, wherein component (F) is an organopolysiloxane resin composed primarily of ($R^1SiO_{3/2}$) units (T units) and ($R^1{}_aR^2{}_{(3-a)}SiO_{1/2}$) units (M units) (wherein each $R^1$ is independently a substituted or unsubstituted monovalent hydrocarbon group of 1 to 20 carbon atoms without an aliphatic unsaturated bond; each $R^2$ is independently a substituted or unsubstituted alkenyl group of 2 to 20 carbon atoms; and the letter a is an integer from 0 to 3) in a molar ratio of M units to T units (M/T) in the range of 1/9 to 9/1.

5. The organopolysiloxane emulsion composition for release paper or release film of claim 1, wherein the content of the component (G) is from 0.1 to 20 parts by weight of an emulsifying agent per 100 parts by weight of component (A).

6. The organopolysiloxane emulsion composition for release paper or release film of claim 1, wherein the mixture further comprises (H) from 0.1 to 10 parts by weight of a pot-life extender per 100 parts by weight of component (A).

7. The organopolysiloxane emulsion composition for release paper or release film of claim 1, wherein component (D) is a compound of any of general formulas (9) to (10).

8. The organopolysiloxane emulsion composition for release paper or release film of claim 1, wherein component (D) is a compound having the following formulas:

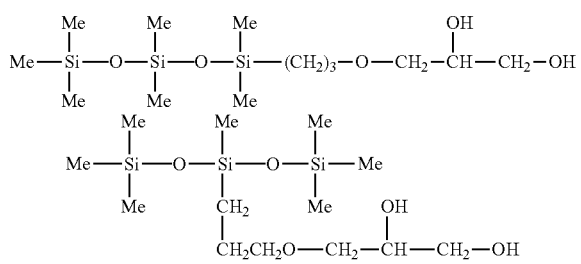

wherein "Me" stands for a methyl groups.

9. The organopolysiloxane emulsion composition for release paper or release film of claim 1, wherein component (G) is selected from the group consisting of nonionic surfactants and water soluble polymers.

10. The organopolysiloxane emulsion composition for release paper or release film of claim 1, wherein component (G) is nonionic surfactants and water soluble polymers.

11. A release paper or release film obtained by applying the organopolysiloxane emulsion composition for release paper or release film of claim 1 to a paper or film substrate, and curing the applied composition.

12. A method for preparing the organopolysiloxane emulsion composition for release paper or release film of claim 1, comprising the steps of preparing:
emulsion composition 1 obtained by dispersing in water a mixture comprising component (B), lacking component (C), and optionally comprising some or all of component (A) and components (D) and (G), and
emulsion composition 2 obtained by dispersing in water a mixture comprising component (C), lacking component (B), and additionally comprising the remaining components,
such that the sum of the silicone components in composition 2 is 3 parts by weight or less per 100 parts by weight of the sum of the silicone components in compositions 1 and 2; and mixing together compositions 1 and 2 just prior to use.

13. A method for preparing the organopolysiloxane emulsion composition for release paper or release film of claim 1, comprising the steps of preparing:
emulsion composition 1' obtained by dispersing in water a mixture comprising component (B), lacking components (C) and (D), and optionally comprising some or all of component (A) and component (G),
emulsion composition 2' obtained by dispersing in water a mixture comprising component (C), lacking components (B) and (D), and optionally comprising some or all of component (A) and component (G), and
emulsion composition 3' obtained by dispersing in water a mixture comprising component (D), lacking component (B) and/or component (C), and additionally comprising the remaining components,
such that the sum of the silicone components in composition 2' is 3 parts by weight or less per 100 parts by weight of the sum of the silicone components in compositions 1', 2' and 3'; and mixing together compositions 1', 2' and 3' just prior to use.

* * * * *